US012671041B2

(12) United States Patent
Goh et al.

(10) Patent No.: US 12,671,041 B2
(45) Date of Patent: Jun. 30, 2026

(54) SYSTEM AND METHOD FOR A POWER SUSTAINABILITY KEYBOARD WITH ELECTROCHROMIC FILM INDICATORS

(71) Applicant: Dell Products, LP, Round Rock, TX (US)

(72) Inventors: Peng Lip Goh, Singapore (SG); Deeder M. Aurongzeb, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 307 days.

(21) Appl. No.: 18/385,638

(22) Filed: Oct. 31, 2023

(65) Prior Publication Data

US 2025/0140492 A1 May 1, 2025

(51) Int. Cl.
*H01H 13/78* (2006.01)
*G02F 1/15* (2019.01)

(52) U.S. Cl.
CPC .............. *H01H 13/78* (2013.01); *G02F 1/15* (2013.01)

(58) Field of Classification Search
CPC ........... H01H 2013/00; H01H 2013/02; H01H 2013/50; H01H 2013/52; H01H 2219/00; H01H 2219/0023; H01H 2219/0026; H01H 2219/018; H01H 2219/02; H01H 2219/036; H01H 2219/039; H01H 13/00; H01H 13/02; H01H 13/023; H01H 13/14; H01H 13/50; H01H 13/52; H01H 13/70; H01H 13/7006; H01H 13/78; H01H 13/83; G02F 1/15

(Continued)

(56) References Cited

U.S. PATENT DOCUMENTS 4,750,399 A    6/1988   Coles
5,298,706 A   *   3/1994   English ................ H01H 13/702
                                               200/534

(Continued)

FOREIGN PATENT DOCUMENTS

EP           2248143 B1     7/2014
WO       95/12841 A1     5/1995

(Continued)

*Primary Examiner* — Anthony R Jimenez

(74) *Attorney, Agent, or Firm* — Prol Intellectual Property Law, PLLC; H. Kenneth Prol

(57) ABSTRACT

A keyboard operatively couplable to an information handling system comprising a keyboard microcontroller on a keyboard printed circuit board (PCB) and a keyboard power management unit operatively coupled to the keyboard microcontroller. An input actuator including a window formed through the input actuator with an electrochromic film layer formed under the input actuator wherein a portion of the electrochromic layer is viewable through the window and an opaque colored film layer formed under the electrochromic film layer such that a voltage pulse passing through the electrochromic film layer changes a state of opacity of the electrochromic film layer and actuation of the input actuator changes a function state of software or hardware at the information handling system that is controlled by the input actuator. The electrochromic film layer state of opacity indicates the function state of software or hardware through the window of the input actuator.

20 Claims, 11 Drawing Sheets

(58) Field of Classification Search
   USPC ........................................................ 200/520
   See application file for complete search history.

(56)                    References Cited

U.S. PATENT DOCUMENTS

| 9,897,885 | B2 | 2/2018 | Huang |
| 2009/0225022 | A1 | 9/2009 | Tolbert |

FOREIGN PATENT DOCUMENTS

| WO | 2005/017931 | A1 | 2/2005 |
| WO | 2009/109813 | A1 | 9/2009 |

* cited by examiner

SYSTEM AND METHOD FOR A POWER SUSTAINABILITY KEYBOARD WITH ELECTROCHROMIC FILM INDICATORS

FIELD OF THE DISCLOSURE

The present disclosure generally relates to a keyboard. The present disclosure more specifically relates to a keyboard having an input actuator, such as a keyboard key or touch icon, that includes an electrochromic film layer.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more gaming applications. Further, the information handling system may include an input device such as a keyboard that includes input actuators, such as keys or a touch icon, used to provide user input to the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
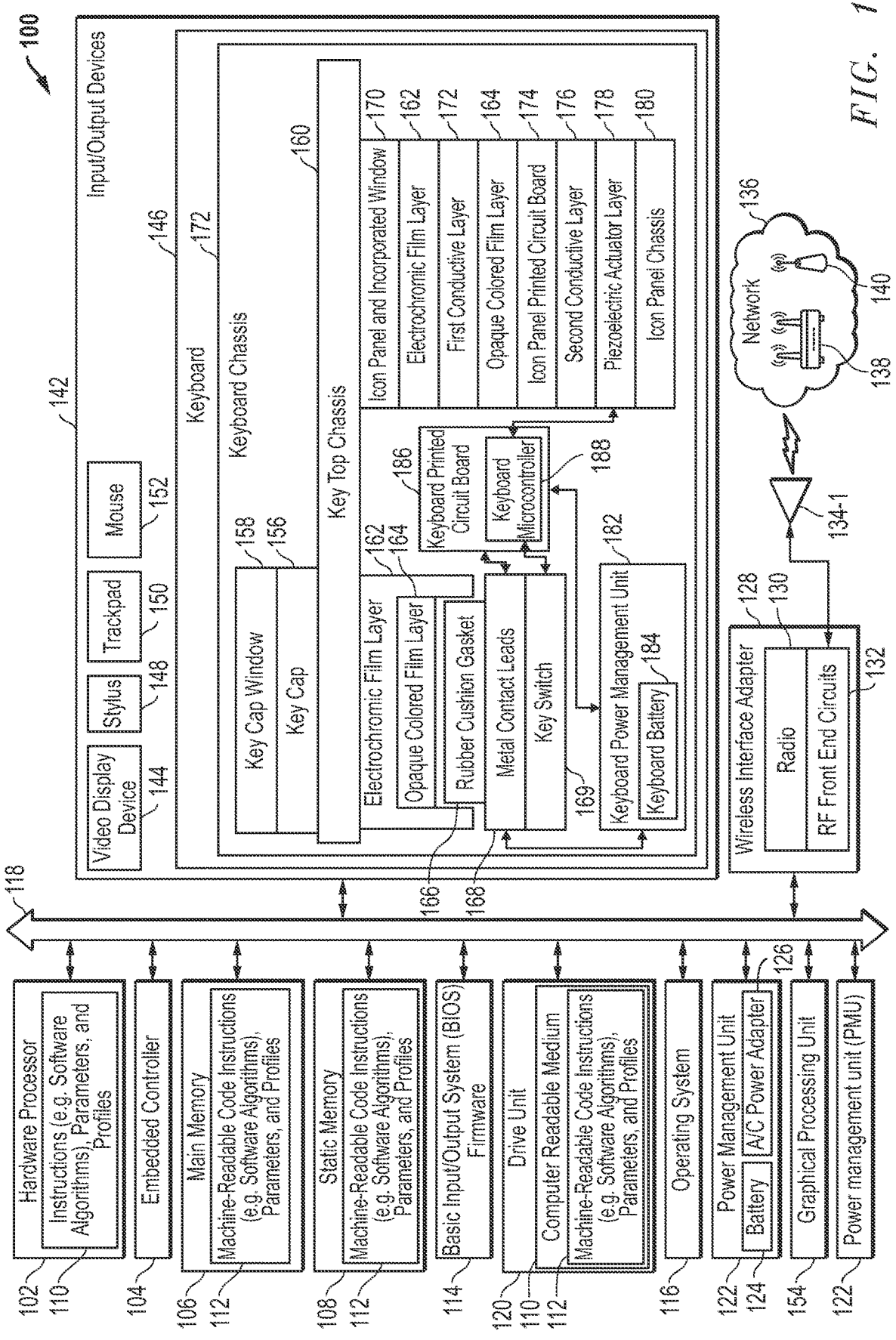
FIG. 1 is a block diagram illustrating an information handling system that includes a keyboard including a plurality of input actuators having a window that allows for the viewing of an electrochromic film layer and opaque colored film according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Keyboards are used by a user to provide input to an information handling system. A keyboard may be wired or wireless. In an embodiment, the keyboard includes a plurality of keys such as those keys generally found on a QWERTY-type keyboard. Additional keys are also provided on a keyboard that allow, for example, a user to toggle between two different states. For example, an input actuator such as a keyboard key or an icon panel with a touch icon may include a "CapsLk" or Caps Lock keyboard key that allows a user to toggle between causing all typed letters of a bicameral script such as English to be generated in capital letters. In another example, an icon panel with touch icons may include certain buttons that allow a user to toggle between a "microphone on" or "microphone off" state allow a user during, for example, a videoconferencing session to selectively mute or unmute the microphone of the information handling systems. Keyboard keys and icon panels with touch icons like these include light emitting diodes (LEDs) associated with them that allow a user to be notified regarding the current state of such an input actuator. A lighted LED may indicate a first state (e.g., Caps Lock activated for the "CapsLk" keyboard key), while an unlit LED may indicate a second state (e.g., Caps Lock not activated for the "CapsLk" keyboard key). These LEDs may consume power while on thereby draining a power source such as a battery of the information handling system or a battery of a standalone keyboard. Where the keyboard is a standalone keyboard operatively coupled to the information handling system via a wireless or wired connection, this increase in power consumption from the battery may increase the rate of replacement of a dry battery cell impacting environmental sustainability. Rechargeable batteries, where used, may also increase the carbon footprint associated with the use of the keyboard by increasing the rate of recharging the rechargeable battery or increasing wear and tear on the rechargeable batteries.

The present specification describes a keyboard operatively couplable to an information handling system that includes a keyboard microcontroller and a keyboard power management unit operatively coupled to the keyboard microcontroller. The keyboard further includes an input actuator including a window formed through the input actuator. The input actuator may be any device that a user may actuate to provide input via the keyboard to an information handling system. For example, the input actuator may be a keyboard key or an icon panel with touch icons in embodiments herein. The keyboard further includes an electrochromic film layer formed under the input actuator wherein a portion of the electrochromic layer is viewable through the window and an opaque colored film layer formed under the electrochromic film layer. In an embodiment, actuation of the input actuator causes a voltage from a voltage source to pass through the electrochromic film layer to change an opacity of the electrochromic film layer. This allows the user to visually determine the state of the actuated input actuator without using an LED that may be provided constant power during use of the keyboard.

In an embodiment, the input actuator is a key cap for a keyboard key of the keyboard that includes the window formed through a portion of the key cap. In an embodiment, metal contact leads may be formed on a surface of the electrochromic film layer under the key cap such that actuation of the key cap by a user causes the metal contacts to contact a voltage source, complete a circuit, and change the opacity of the electrochromic film layer. Because the electrochromic film layer requires a single voltage source pulse to switch from an opaque state to a transparent state or back again, constant power is not needed to change the opacity of the electrochromic film layer. The voltage levels of the single voltage source pulse to switch the electrochromic film layer are very low as well, thus additional power savings are realized over constant power to a light source such as an LED.

In another embodiment, the input actuator is an icon panel and incorporated window. The icon panel may include one or a plurality of touch icons. The icon panel includes a first conductive layer formed under a portion of electrochromic film layer and an icon panel printed circuit board (PCB) formed under the first conductive layer. In an embodiment, the first conductive layer operatively couples the electrochromic film layer to the icon panel PCB. In an embodiment, the icon panel and incorporated window includes a second conductive layer formed under a portion of the icon panel PCB and a piezoelectric actuator layer formed under the icon panel PCB. The second conductive layer operatively couples the piezoelectric actuator layer to an underside surface of the icon panel PCB in an embodiment. With this configuration, actuation of the icon panel and incorporated window by a user imparts a force on the piezoelectric actuator layer such that a low voltage is created by the force imparted on the piezoelectric actuator layer. This low voltage or low voltage from another source may be transmitted through the second conductive layer, through the icon panel PCB, through the first conductive layer, and into the electrochromic film layer to change the opacity of the electrochromic film layer. Again, because the electrochromic film layer requires a single voltage source pulse to switch from an opaque state to a transparent state or back again, constant power is not needed to power and LED or other light source and the pulse to change the opacity of the electrochromic film layer saves power.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 138, a base station transceiver 140, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video, or data communication. For example, an information handling system

100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include main memory 106, (volatile (e.g., random-access memory, etc.), or static memory 108, nonvolatile (read-only memory, flash memory etc.) or any combination thereof), one or more hardware processing resources, such as a hardware processor 102 that may be a central processing unit (CPU), a graphics processing unit (GPU) 154, hardware processor 102, embedded controller (EC) 104, or any combination thereof. Additional components of the information handling system 100 may include one or more storage devices such as static memory 108 or drive unit 120. The information handling system 100 may include or interface with one or more communications ports for communicating with external devices, as well as various input and output (I/O) devices 142, such as the wired or wireless keyboard 146 described herein, a trackpad 150, a mouse 152, a stylus 148, a video/graphics display device 144, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 112 that may operate on servers or systems, remote data centers, or on-box in individual client information handling systems according to various embodiments herein.

The information handling system 100 may include the hardware processor 102 such as a central processing unit (CPU). Any of the processing resources may operate to execute code that is either firmware or software code. Moreover, the information handling system 100 may include memory such as main memory 106, static memory 108, and disk drive unit 120 (volatile (e.g., random-access memory, etc.), nonvolatile memory (read-only memory, flash memory etc.) or any combination thereof or other memory with computer readable medium 110 storing instructions (e.g., software algorithms), parameters, and profiles 112 executable by the EC 104, hardware processor 102, GPU 154, or any other processing device. The information handling system 100 may also include one or more buses 118 operable to transmit communications between the various hardware components such as any combination of various I/O devices 142 as well as between hardware processors 102, an EC 104, the operating system (OS) 116, the basic input/output system (BIOS) 114, the wireless interface adapter 128, or a radio module, among other components described herein. In an embodiment, the information handling system 100 may be in wireless communication with the I/O devices 142 such as the wired or wireless keyboard 146 described herein, a mouse 152, video display device 144, stylus 148, or trackpad 150 among other peripheral devices.

The information handling system 100 further includes a video/graphics display device 144. The video/graphics display device 144 in an embodiment may function as a liquid crystal display (LCD), an organic light emitting diode (OLED), a flat panel display, or a solid-state display. Additionally, as described herein, the information handling system 100 may include one or more other I/O devices 142 including the wired or wireless keyboard 146 described herein that allow the user to interface with the information handling system 100 via the video/graphics display device 144, such as a cursor control device (e.g., a mouse 152, trackpad 150, or gesture or touch screen input), and/or a stylus 148, among others. Various drivers and control electronics may be operatively coupled to operate the I/O devices 142 according to the embodiments described herein. The present specification contemplates that the I/O devices 142 may be wired or wireless. In the context of a wireless keyboard 146 as described herein in some embodiments, the wireless keyboard 146 is operatively coupled to the information handling system 100 via a wireless connection via a wireless keyboard radio (not shown) and wireless keyboard antenna (not shown) or may be integrated such as with a laptop base chassis keyboard.

A network interface device of the information handling system 100 shown as wireless interface adapter 128 can provide connectivity among devices such as with Bluetooth® (e.g., 2.4 GHz) or to a network 136, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an AP 138 or base station 140 used to operatively couple the information handling system 100 to a network 136. In embodiments described herein, the wireless interface device 128 with its radio 130, RF front end 132 and antenna is used to communicate with the wireless keyboard 146 and a keyboard radio thereon (not shown) in some example embodiments via, for example, a Bluetooth® (e.g., at 2.4 GHz) protocol or a Bluetooth® Low Energy protocol (BLE). In another embodiment, the network 136 may include macro-cellular connections via one or more base stations 140 or a wireless AP 138 (e.g., Wi-Fi), or such as through licensed or unlicensed WWAN small cell base stations 140. Connectivity may be via wired or wireless connection. For example, wireless network wireless APs 138 or base stations 140 may be operatively connected to the information handling system 100. Wireless interface adapter 128 may include one or more radio frequency (RF) subsystems (e.g., radio 130) with transmitter/receiver circuitry, modem circuitry, one or more antenna radio frequency (RF) front end circuits 132, one or more wireless controller circuits, amplifiers, antennas 134 and other circuitry of the radio 130 such as one or more antenna ports used for wireless communications via multiple radio access technologies (RATs). The radio 130 may communicate with one or more wireless technology protocols.

In an embodiment, the wireless interface adapter 128 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 128 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. The wireless interface adapter 128 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 112 or receives and executes instructions, parameters, and profiles 112 responsive to a propagated signal, so that a device connected to a network 136 may communicate voice, video, or data over the network 136. Further, the instructions 112 may be transmitted or received over the network 136 via the network interface device or wireless interface adapter 128. For example, instructions 112 may be executed by a hardware processor 102, GPU 154, EC 104 or any other hardware processing resource and may include software agents, or other aspects or components used to execute the methods and systems described herein. Various software modules comprising application instructions 112 may be coordinated by an OS 116, and/or via an application programming interface (API). An example OS 116 may include Windows®, Android®, and other OS types. Example APIs may include Win 32, Core Java API, or Android APIs.

In an embodiment, the information handling system 100 may include a disk drive unit 120. The disk drive unit 120 and may include machine-readable code instructions, parameters, and profiles 112 in which one or more sets of machine-readable code instructions, parameters, and profiles 112 such as firmware or software can be embedded to be executed by the hardware processor 102 or other hardware processing devices such as a GPU 154 or EC 104, or other microcontroller unit to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the disk drive 120 during execution by the hardware processor 102, EC 104, or GPU 154 of information handling system 100.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like, read only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

In an embodiment, the information handling system 100 may further include a power management unit (PMU) 122 (a.k.a. a power supply unit (PSU)). The PMU 122 may include a hardware controller and executable machine-readable code instructions to manage the power provided to the components of the information handling system 100 such as the hardware processor 102 and other hardware components described herein. The PMU 122 may control power to one or more components including the one or more drive units 120, the hardware processor 102 (e.g., CPU), the EC 104, the GPU 154, a video/graphic display device 144, or other wired I/O devices 142 such as the stylus 148, a mouse 152, a wired or integrated keyboard 146 in some embodiment apart from a wireless keyboard, and a trackpad 150 and other components that may require power when a power button has been actuated by a user. In an embodiment, the PMU 122 may monitor power levels and be electrically coupled to the information handling system 100 to provide this power. The PMU 122 may be coupled to the bus 118 to provide or receive data or machine-readable code instructions. The PMU 122 may regulate power from a power source such as the battery 124 or AC power adapter 126. In an embodiment, the battery 124 may be charged via the AC power adapter 126 and provide power to the components of the information handling system 100, via wired connections as applicable, or when AC power from the AC power adapter 126 is removed.

As described herein, the keyboard 146 may include one or more input actuators. In the context of the present specification, an input actuator may include any device that a user may actuate to provide input via the keyboard 146 to the information handling system 100. As such, an input actuator may include a keyboard key that includes a key cap 156 or an icon panel and incorporated window 170 with touch icons. Each of the key cap 156 and icon panel and incorporated window 170 with touch icons may include one or more windows formed therein that allows a user to see through the key cap 156 or icon panel and incorporated window 170. An example of a keyboard key may include, for example, a "CapsLk" or caps lock key, a "FnLock" or function lock key, and a "Num Lock" or number lock key, among others. An example of an icon panel and incorporated window 170 may include a dedicated portion of the keyboard that includes touch icons depicting various togglable functions and inputs a user may provide at the keyboard 146. These touch icons may include, for example, a "pause" button that toggles between pausing an audio output or continuing the audio output, a "mute" button that taggles between a muted microphone state or an unmuted microphone state, and a camera button that toggles between an on and off state of a built in or operatively coupled webcam, among other touch icons. It is appreciated that these are merely examples of keyboard keys and touch icons on an icon panel that may be incorporated into the keyboard 146, and the present specification contemplates other keyboard keys and touch icons that allow a user to toggle input provided at the keyboard 146 from a first state and a second state.

In the example where the input actuator is a keyboard key, the input actuator includes a key cap 156 that includes a key cap window 158 formed therein. The key cap window 158 may include, in an embodiment, a hole formed into a portion of the key cap 156 such that a user may see through the key cap 156. In another embodiment, the key cap window 158 may include a portion of the key cap 156 that does not include a color such that it is transparent, and the user can see through the key cap 156. In another embodiment, the key cap window 158 may include a hole through the key cap 156 that has a transparent plastic or glass fitted into the key cap window 158 that, again, allows a user to see through the key cap 156.

In an embodiment, the keyboard key may be formed along a portion of a keyboard top chassis 160. As such, the keyboard top chassis 160 may include a key well where a keyboard key is to be formed and located such that the key cap 156 may be operatively coupled to the keyboard 146 at the key well formed into the keyboard 146. It is appreciated that a plurality of keyboard keys may be formed into the keyboard top chassis 160 of the keyboard 146.

In an embodiment, the keyboard key may include an electrochromic film layer 162 formed under the key cap 156. In an embodiment, the electrochromic film layer 162 may be any type of electrochromic film that, when a voltage pulse is applied to the electrochromic film, the electrochromic film layer 162 toggles between an opaque state to a transparent state. In an embodiment, the electrochromic film layer 162 may be made of a series of layers that include an ion storage layer (e.g., an electrolyte) and electrochromic layer sandwiched between conductive layers. In some embodiments, the electrochromic layer of the electrochromic film may include any electrochromic material such as a gel substance containing a transition metal oxide such as tungsten trioxide ($WO_3$). Other gel-infused electrochromic materials may include molybdenum (Mo), titanium (T) and niobium (Nb) oxides, among others. As a voltage pulse is applied to the conductive layers of the electrochromic film layer 162, the opacity changes from opaque or non-transparent state to a transparent or semi-transparent state. Similarly, a second voltage pulse may return the electrochromic film layer 162 back from a transparent or semi-transparent state to an opaque or non-transparent state. However, because a constant voltage is not necessary to maintain either the opaque state or the transparent state, a single voltage pulse applied to the electrochromic film layer 162 causes the toggling between the opaque state and the transparent state.

In an embodiment, an opaque colored film layer 164 may be placed under the electrochromic film layer 162. During operation, as the voltage pulse is applied to the electrochromic film layer 162 and the electrochromic film layer 162 is made transparent, the user may see through the key cap window 158 formed into the key cap 156, through the now transparent electrochromic film layer 162, and to the opaque colored film layer 164 to display the color of the opaque colored film layer 164. Further during operation, as a second voltage pulse is applied to the electrochromic film layer 162 and the electrochromic film layer 162 is made opaque, the user sees the opaque color of the electrochromic film layer 162 through the key cap window 158 formed into the key cap 156 and the key cap window turns an opaque color, such as black, gray, or white, to display the color of the opaque colored key cap window 158. This change the opacity of the electrochromic film layer 162, therefore, changes the indicator state of the keyboard key thereby identifying to the user that the toggling has occurred between functional states. In an embodiment, the color of the opaque colored film layer 164 may be such so as to identify to the user that the actuation of the key cap 156 has occurred and is different from a color of the key cap window 158 when it is made opaque. In an example embodiment, the color of the opaque colored film layer 164 is red. Other prominent colors may be used such that the user may easily distinguish between a first state of the keyboard key (e.g., caps lock activated at a "CapsLk" key) and a second state of the keyboard key (e.g., caps lock not activated at the "CapsLk" key).

In order to provide the voltage pulse to the electrochromic film layer 162, the electrochromic film layer 162 may include one or more metal contact leads 168. These metal contact leads 168 may be arranged on an underside surface of the electrochromic film layer 162 such that they may contact a circuit when the user has actuated the key cap 156. In an embodiment, this circuit may be formed onto a keyboard printed circuit board (PCB) 186 such that when the metal contact leads 168 contact the circuit on the keyboard PCB, the circuit is closed causing a voltage pulse to pass through the electrochromic film layer 162. Further, keyboard PCB 186 may also include a key switch 169 for each keyboard key to detect user actuation of the key as well as a keyboard microcontroller 188. Depending on the state of the electrochromic film layer 162, the voltage pulse may switch the electrochromic film layer 162 from an opaque state to a transparent state or vice versa. Additionally, actuation of the keyboard key and the key switch 169 will send user input to the keyboard microcontroller 188 for a function change that corresponds with the state of the electrochromic film layer 162 indicating that functional state. The function change user input by actuation of the keyboard key may be sent from the keyboard microcontroller to the information handling system 100 and a keyboard driver executing thereon to change the function for software instructions 110 or hardware. A subsequent actuation of the key cap 156 by the user may switch the electrochromic film layer 162 back to the previous state. Correspondingly, the actuation of the key switch 169 will change the functional state at the information handling system 100 via the keyboard microcontroller 188. Again, when the electrochromic film layer 162 is switched from an opaque state to the transparent state, the opaque colored film layer 164 below the electrochromic film layer 162 is made viewable by the user through the key cap window 158 and now transparent electrochromic film layer 162. When the electrochromic film layer 162 is switched back to an opaque state, the key cap window 158 takes on the color of the opaque state such as black, gray or white and may match the color of the keyboard key in some embodiments.

In an embodiment, a rubber cushion gasket 166 may be formed into the keyboard top chassis 160. The rubber cushion gasket 166 may be placed under the key cap 156 such that, upon actuation of the key cap 156 by a user, an underside of the key cap 156 contacts the top of the rubber cushion gasket 166. The contact of the key cap 156 to the rubber cushion gasket 166 reduces a noise produced by the actuation of the key cap 156 by the user. Additionally, the rubber cushion gasket 166 may electrically isolate the electrochromic film layer 162 and its metal contact leads 168 from the electrical contacts of a key switch 169 formed on, for example, a keyboard PCB 186 so that accidental closing of the circuit formed on the keyboard PCB 186 does occur.

In an embodiment, the circuit formed on the keyboard PCB 186 may be operatively coupled to a power source such as a battery or A/C power source. In an example embodiment, where the keyboard 146 is a built-in or wired keyboard 146, the hardware controller of the PMU 122 of the information handling system 100 or the keyboard PMU 182 may include executable machine-readable code instructions to manage the power (e.g., either battery 124 or A/C power adapter 126) provided to the circuit formed on the keyboard PCB used at the key cap 156 and electrochromic film layer 162 to provide the voltage signal to the electrochromic film layer 162. In an embodiment where the keyboard 146 is a wireless keyboard 146, a keyboard PMU 182 may direct power from a keyboard battery 184 power source (e.g., dry cell battery 184 or rechargeable battery 184) to provide the voltage signal to the electrochromic film layer 162.

In an embodiment, a keyboard microcontroller 188 formed on the keyboard PCB 186 may be operatively coupled to the keyboard PMU 182. As the keyboard PMU 182 detects a voltage pulse being sent through the electrochromic film layer 162, the keyboard PMU 182 may indicate as such to the keyboard microcontroller 188. An input signal from key switch 169 changing functional state of hardware or software at the information handling system 100 may also be received at the keyboard microcontroller 188. The keyboard microcontroller 188 may be provided with an initial state of the electrochromic film layer 162 (e.g., opaque or transparent) and determine the state of the electrochromic film layer 162 and, accordingly, the state of the togglable key cap 156 such that the user input to the information handling system 100 may be provided correctly. For example, the keyboard microcontroller 188 may be provided with an initial state of the electrochromic film layer 162 (e.g., opaque) when the "CapsLk" key is not active and monitor, via the signal from the keyboard PMU 182, when the electrochromic film layer 162 has switched from an opaque to a transparent state indicative of the "CapsLk" key being activated via the actuation of key switch 169 and subsequent bicameral script is to be generated as capital letters instead of lowercase letters in a word processing software.

In the example where the input actuator is an icon panel and incorporated window 170, the icon panel and incorporated window 170 includes an icon panel with a window or transparent portion of the icon panel and incorporated window 170 at a touch icon in an embodiment. Plural windows or transparent portions of the icon panel and incorporated window 170 at plural touch icons are contemplated as well in embodiments herein. The window formed into the icon panel and incorporated window 170 may be in the shape of certain touch icons representing the available togglable inputs provided to an information handling system 100, in an example embodiment. As described herein, these touch icons that form the windows in the icon panel and incorporated window 170 may have display a shape of a microphone representing a "mute" button and a video camera representing a video streaming on and off button, among other touch icons. It is appreciated that these are merely examples of touch icons that may be presented on the icon panel and incorporated window 170 that may be incorporated into the keyboard 146, and the present specification contemplates other touch icons that allow a user to toggle user input provided at the keyboard 146 for functional change of software or hardware at the information handling system from a first state and a second state.

In an embodiment, an electrochromic film layer 162 may be placed under the icon panel and incorporated window 170. Again, the electrochromic film layer 162 may be any type of electrochromic film that, when a voltage pulse is applied to the electrochromic film, the electrochromic film layer 162 toggles between an opaque state to a transparent state or back again. In an embodiment, the electrochromic film layer 162 may be made of a series of layers that include an ion storage layer (e.g., an electrolyte) and electrochromic layer sandwiched between conductive layers.

In an embodiment, a first conductive layer 172 may be placed under, at least, a portion of the electrochromic film layer 162. In an embodiment, this first conductive layer 172 may be any type of conductive material that conducts a voltage pulse to the electrochromic film layer 162. In an embodiment, the first conductive layer 172 may be a conductive sponge or foam that includes, for example, a solid metal such as aluminum (Al) with gas-filled pores.

In an embodiment, the opaque colored film layer 164 may also be formed under the electrochromic film layer 162. As described herein, as the voltage pulse is applied to the electrochromic film layer 162 and the electrochromic film layer 162 is made transparent, the user may see through the windows formed into the icon panel and incorporated window 170, through the now transparent electrochromic film layer 162, and to the opaque colored film layer 164. This change the opacity of the electrochromic film layer 162, therefore, changes the indicator state of the touch icon on the icon panel and incorporated window 170 thereby identifying to the user that the toggling has occurred. As second voltage pulse is applied to the electrochromic film layer 162 and the electrochromic film layer 162 is made opaque and may be the color of such an opaque icon panel and incorporated window 170 to indicate an alternative toggle state. The color of the opaque icon panel and incorporated window 170 may be black, white, gray or another color different from the color of the opaque colored film layer 164. In an embodiment, the color of the opaque colored film layer 164 may be such so as to identify to the user that the actuation of the icon windows has occurred. In an example embodiment, the color of the opaque colored film layer 164 is red. Other prominent colors may be used such that the user may easily distinguish between a first state of the keyboard key (e.g., mute on) and a second state of the keyboard key (e.g., mute off).

In an embodiment, an icon panel PCB 174 may be placed under the first conductive layer 172 and opaque colored film layer 164. In an embodiment, the first conductive layer 172 may be sandwiched between the top surface of the icon panel PCB 174 and the bottom surface of the electrochromic film layer 162. In an embodiment, the icon panel PCB 174 may include electrical traces that operatively and electrically couples the icon panel PCB 174, through the first conductive layer 172, and to the electrochromic film layer 162.

In an embodiment, the electrical traces may pass through the icon panel PCB 174 such that the electrical traces on the top surface of the icon panel PCB 174 are electrically coupled to electrical traces formed on a bottom surface of the icon panel PCB 174. This allows a second conductive layer 176 to be operatively coupled to these electrical traces formed on the bottom surface of the icon panel PCB 174. Like the first conductive layer 172, the second conductive layer 176 may be an electrically conductive sponge or foam. Thus, an electrical circuit is created from the second conductive layer 176, through the icon panel PCB 174 via the electrical traces formed on and through the top and bottom surfaces of the icon panel PCB 174, through the first conductive layer 172, and to the electrochromic film layer 162.

In an embodiment, a piezoelectric actuator layer 178 is formed under the second conductive layer 176 and icon panel PCB 174. The piezoelectric actuator layer 178 includes a piezoelectric material that, when force is applied to the piezoelectric material when a user actuates the icon panel and incorporated window 170, a voltage is created. The voltage created at the piezoelectric actuator layer 178 is conducted through the second conductive layer 176, through the electrical traces formed on and through the icon panel PCB 174, through the first conductive layer 172 and into the electrochromic film layer 162 in order to change the opacity of the electrochromic film layer 162 as described herein. This voltage may be a low voltage. In an alternative embodiment, the electrical circuit is created from the second conductive layer 176, through the icon panel PCB 174 via the electrical traces formed on and through the top and bottom surfaces of the icon panel PCB 174, through the first conductive layer 172, and to the electrochromic film layer 162 may contact a voltage source from keyboard PMU 182 instead to provide a voltage pulse to change the to change the opacity of the electrochromic film layer 162 as described herein. Additionally, piezoelectric actuator layer 178 may signal user toggle input to the keyboard microcontroller 188 to change a functional state of software or hardware on information handling system 100 as well when the piezoelectric actuator layer 178 is distended by force applied by the user to a touch icon.

In an embodiment, an icon panel chassis 180 is formed under the piezoelectric actuator layer 178 in order to support those layers and devices below the icon panel and incorporated window 170 described herein. In an embodiment, the icon panel chassis 180 may include a number of coupling holes that allow a screw, bolt, clips, posts, or other fastening device to pass through in order to secure the icon panel chassis 180 to the keyboard top chassis 160.

In an embodiment, an electrical lead may be operatively coupled from the piezoelectric actuator layer 178 to the keyboard microcontroller 188. The electrical lead may be operatively coupled to a general-purpose input/output (GPIO) port of the keyboard microcontroller 188 so that the voltage created by the deformation of the piezoelectric actuator layer 178 may be detected at the keyboard microcontroller 188 as a user toggle input. The detection of the voltage output from the piezoelectric actuator layer 178 allows the keyboard microcontroller 188 to determine a current state of the electrochromic film layer 162 as well as determine actuation of the touch icon to change the functional state of hardware or software at the information handling system 100. Again, in an embodiment, the keyboard microcontroller 188 may be provided with an initial state of the electrochromic film layer 162 (e.g., opaque or transparent) and determine the state of the electrochromic film layer 162 and, accordingly, the state of the touch icon and its toggle functionality at the icon panel and incorporated window 170 such that input to the information handling system 100 may be provided correctly. For example, the keyboard microcontroller 188 may be provided with an initial state of the electrochromic film layer 162 (e.g., opaque) when a mute touch icon is not active. The keyboard microcontroller 188 monitors, via the voltage output from the deformation of the piezoelectric actuator layer 178 by actuation of the mute touch icon, when the keyboard microcontroller 188 has received user toggle input to switch a microphone from an unmute state to a mute state and switch the electrochromic film layer 162 from an opaque to a transparent state indicative of the "mute" touch icon shown on the icon panel and incorporated window 170 being actuated so that the keyboard microcontroller 188 may selectively mute and unmute a microphone at the information handling system 100 and display the toggle state of the microphone or other I/O device 142.

The keyboard 146 may further include a keyboard PCB 186. As described herein, the keyboard PCB 186 may be used to electrically couple the keyboard microcontroller 188 as well as other electrical circuits and hardware (e.g., keyboard PMU 182) and including operative coupling to key switches 169 or a piezoelectric actuator layer 178.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
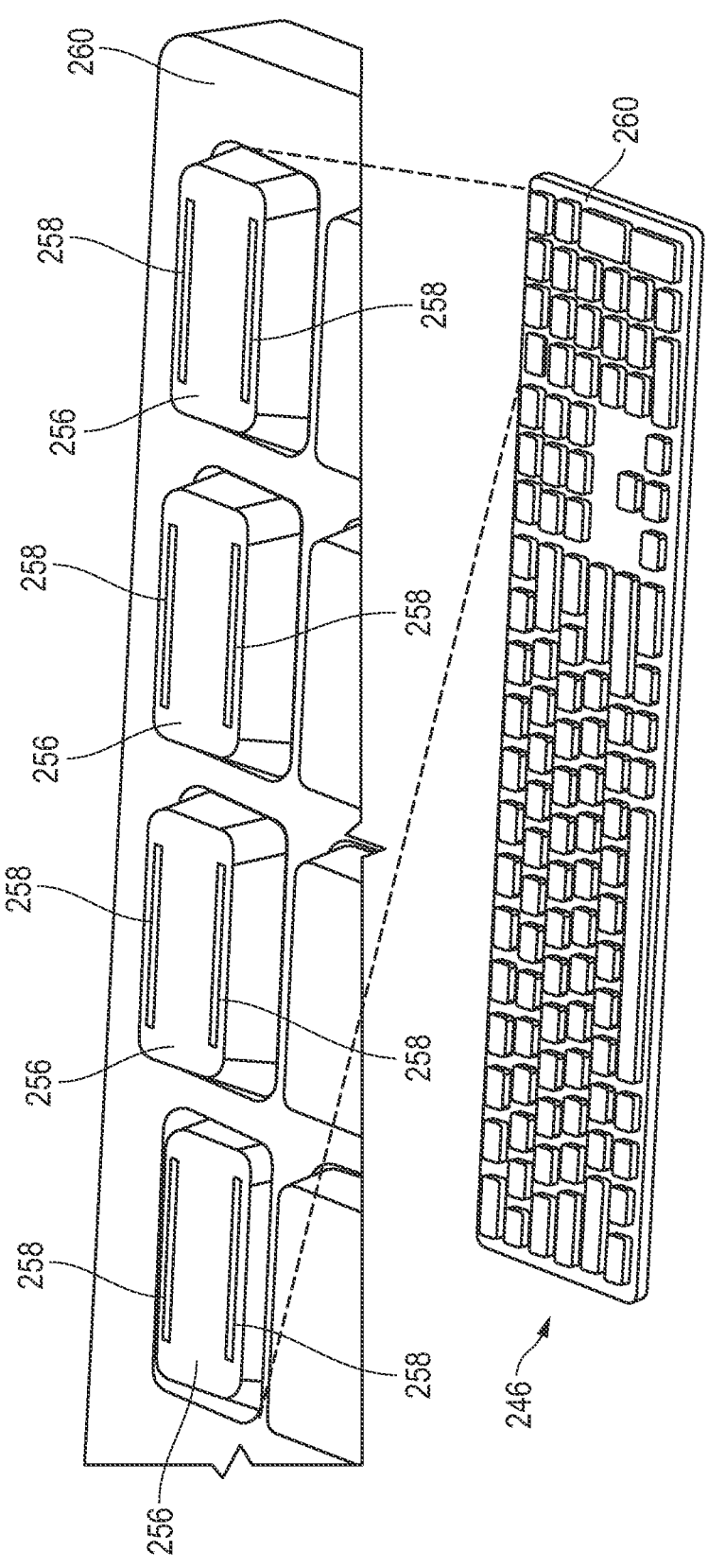
FIG. 2 is a top, perspective view of a keyboard having a plurality of input actuators with a close-up, top view of a plurality of input actuators that are keyboard keys according to an embodiment of the present disclosure.

FIG. 2 is a top, perspective view of a keyboard 246 having a plurality of input actuators that are keyboard keys with a close-up, top view of a subset plurality of the input actuators according to an embodiment of the present disclosure. As described herein, the input actuators include any device that a user may actuate to provide input via the keyboard 146 to the information handling system. In the example embodiment shown in FIG. 2, the input actuator include a keyboard key that includes a key cap 256. FIG. 2 also shows a close-up view of four different keyboard keys with their respective key caps 256.

In an embodiment, each key cap 256 includes one or more key cap windows 258. The key cap window 258 may include, in an embodiment, a hole or aperture formed into a portion of the key cap 256 such that a user may see through the key cap 256. In another embodiment, the key cap window 258 may include a portion of the key cap 256 that does not include a color such that it is transparent, and the user can see through the key cap 256. In another embodiment, the key cap window 258 may include a hole or aperture through the key cap 256 that has a transparent plastic or glass fitted into the key cap window 258 that, again, allows a user to see through the key cap 256.

In an embodiment, the keyboard key that includes the key cap 256 may be formed along a portion of a keyboard top chassis 260. As such, the keyboard top chassis 260 may include a key well where the keyboard key is to be disposed such that the key cap 256 may be operatively coupled to the keyboard 246 at the key well formed into the keyboard 246 and actuated therein. It is appreciated that a plurality of keyboard keys may be formed into the keyboard top chassis 260 of the keyboard 246.

Figures 3A, 3B:
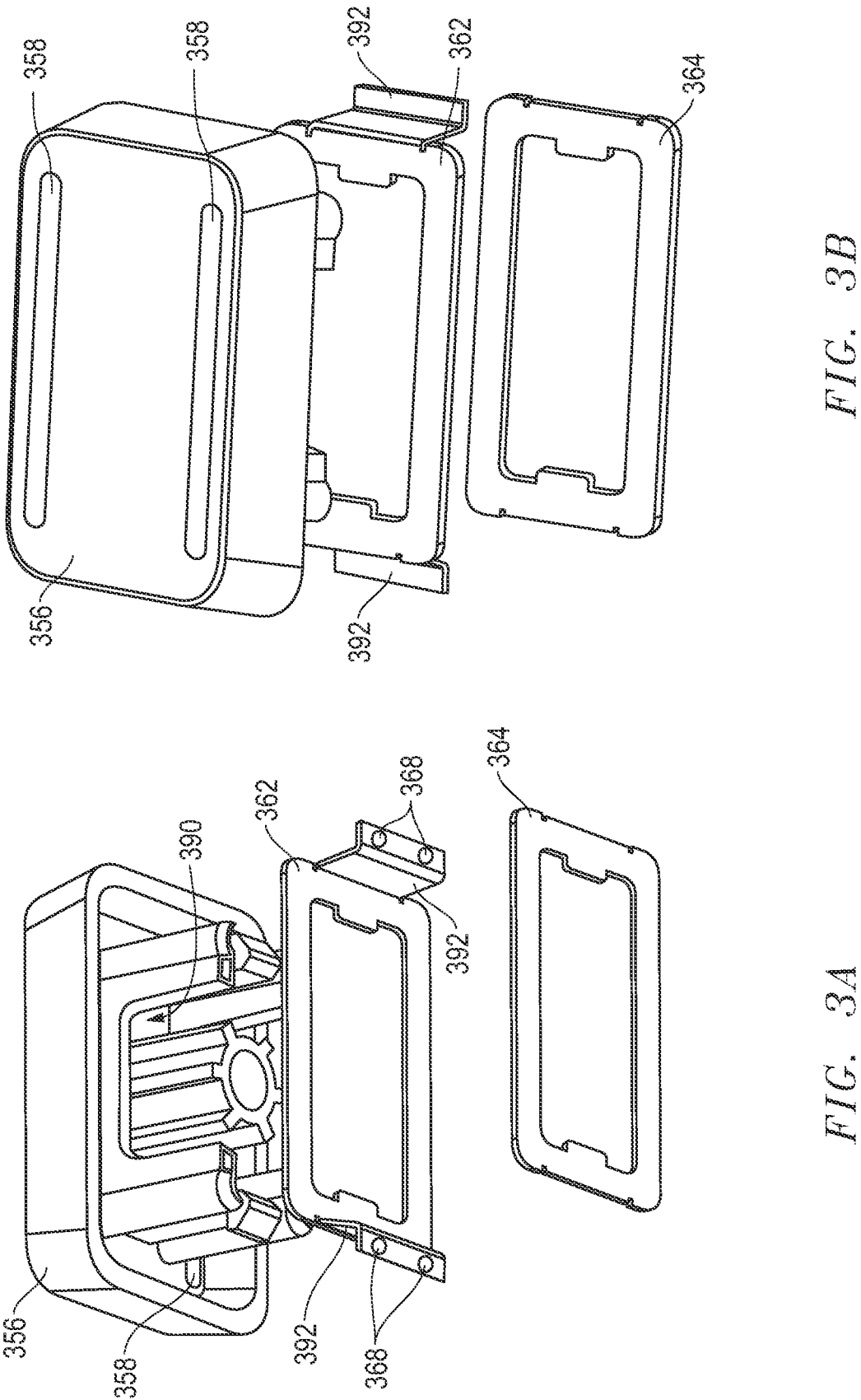
FIG. 3A is a bottom, exploded view of an input actuator that is a keyboard key of a keyboard including an electrochromic film layer and an opaque colored film layer according to another embodiment of the present disclosure.
FIG. 3B is a top, exploded view of an input actuator that is a keyboard key of a keyboard including an electrochromic film layer and an opaque colored film layer according to another embodiment of the present disclosure.

FIG. 3A is a bottom, exploded view of an input actuator such as a key cap 256 of a keyboard (not shown) including an electrochromic film layer 362 and an opaque colored film layer 364 according to another embodiment of the present disclosure. Similarly, FIG. 3B is a top, exploded view of an input actuator such as a key cap 356 of a keyboard (not shown) including an electrochromic film layer 362 and an opaque colored film layer 364 according to another embodiment of the present disclosure. FIGS. 3A and 3B show additional features of the key cap 356, electrochromic film layer 362, and the opaque colored film layer 364.

The key cap 356, as described herein, includes a plurality of key cap windows 358 formed through the key cap 356 in FIGS. 3A and 3B. In an embodiment, a first key cap window 358 may be formed along a top edge of the key cap 356 and a second key cap window 358 is formed along a bottom edge of the key cap 356. It is appreciated, however, that the number of placement of the key cap windows 358 may vary and the number of locations of the key cap windows 358 in FIGS. 3A and 3B are merely examples. Further, FIG. 3A shows an underside of the key cap 356 such that the first key cap window 358 formed along a top edge of the key cap 356 can be seen.

In an embodiment, the key cap 356 includes a key cap channel 390 formed on the underside of the key cap 356. As described herein, the underside of the key cap 356 may interface with a rubber dome. The rubber dome is used to keep the key cap 356 in an unactuated state unless and until a user actuates the key cap 356 and further may be compressed to actuate a key switch according to embodiments herein. When the user does actuate the key cap 356, a force applied to the underside of the key cap 356 by the rubber dome is overcome and the key cap 356 travels further into a key well formed in a top keyboard chassis to actuate a key switch.

In an embodiment, the keyboard key may include an electrochromic film layer 362 formed under the key cap 356. In an embodiment, the electrochromic film layer 362 may be any type of electrochromic film that, when a voltage pulse is applied to the electrochromic film, the electrochromic film layer 362 toggles between an opaque state to a transparent state. In an embodiment, the electrochromic film layer 362 may be made of a series of layers that include an ion storage layer (e.g., an electrolyte) and electrochromic layer sandwiched between conductive layers. In some embodiments, the electrochromic layer of the electrochromic film may include any electrochromic material such as a gel substance containing a transition metal oxide such as tungsten trioxide ($WO_3$). Other gel-infused electrochromic materials may include molybdenum (Mo), titanium (T) and niobium (Nb) oxides, among others. As a voltage pulse is applied to the conductive layers of the electrochromic film layer 362, the opacity changes from opaque or non-transparent to a transparent or semi-transparent state. However, because a constant voltage is not necessary to maintain either the opaque state or the transparent state, a single voltage pulse applied to the electrochromic film layer 362 causes the toggling between the opaque state and the transparent state.

In an embodiment, an opaque colored film layer 364 may be placed under the electrochromic film layer 362. During operation the electrochromic film layer 362 is initially opaque indicating a first color toggle state. During operation, as the voltage pulse is applied to the electrochromic film layer 362 and the electrochromic film layer 362 is made transparent, the user may see through the key cap window 358 formed into the key cap 356, through the now transparent electrochromic film layer 362, and to the opaque colored film layer 364. This change the opacity of the electrochromic film layer 362, therefore, changes the indicator state of the keyboard key thereby identifying to the user that the toggling has occurred. In an embodiment, the color of the opaque electrochromic film layer 362 or the opaque colored film layer 364 underneath may be such so as to identify to the user the actuation state for the toggle function of the key cap 356 that has occurred. In an example embodiment, the color of the opaque colored film layer 364 is red while the opaque color of the electrochromic film layer 362 is another color. Other prominent colors may be used such that the user may easily distinguish between a first state of the keyboard key (e.g., caps lock activated at a "CapsLk" key) and a second state of the keyboard key (e.g., caps lock not activated at the "CapsLk" key).

In order to provide the voltage pulse to the electrochromic film layer 362, the electrochromic film layer 362 may include one or more metal contact leads 368. In the embodiments shown in FIGS. 3A and 3B, the metal contact leads 368 are formed on terminal ends of electrochromic film extensions 392 that extend the electrochromic film layer 362 downward and below a bottom surface of the key cap 356. These metal contact leads 368 may be arranged on an underside surface of the electrochromic film extensions 392 of the electrochromic film layer 362 such that they may contact a circuit when the user has actuated the key cap 356 to receive a voltage pulse. In an embodiment, this circuit may be formed onto a keyboard PCB (not shown) such that when the metal contact leads 368 contact the circuit on the keyboard PCB, the circuit is closed causing a voltage pulse to pass through the electrochromic film layer 362. Depending on the state of the electrochromic film layer 362, the voltage pulse may switch the electrochromic film layer 362 from an opaque state to a transparent state or visa versa. A subsequent actuation of the key cap 356 by the user may switch the electrochromic film layer 362 back to the previous state. Again, when the electrochromic film layer 362 is switched from an opaque state to the transparent state, the opaque colored film layer 364 below the electrochromic film layer 362 is made viewable by the user through the key cap window 358 and now transparent electrochromic film layer 362.

Figure 4:
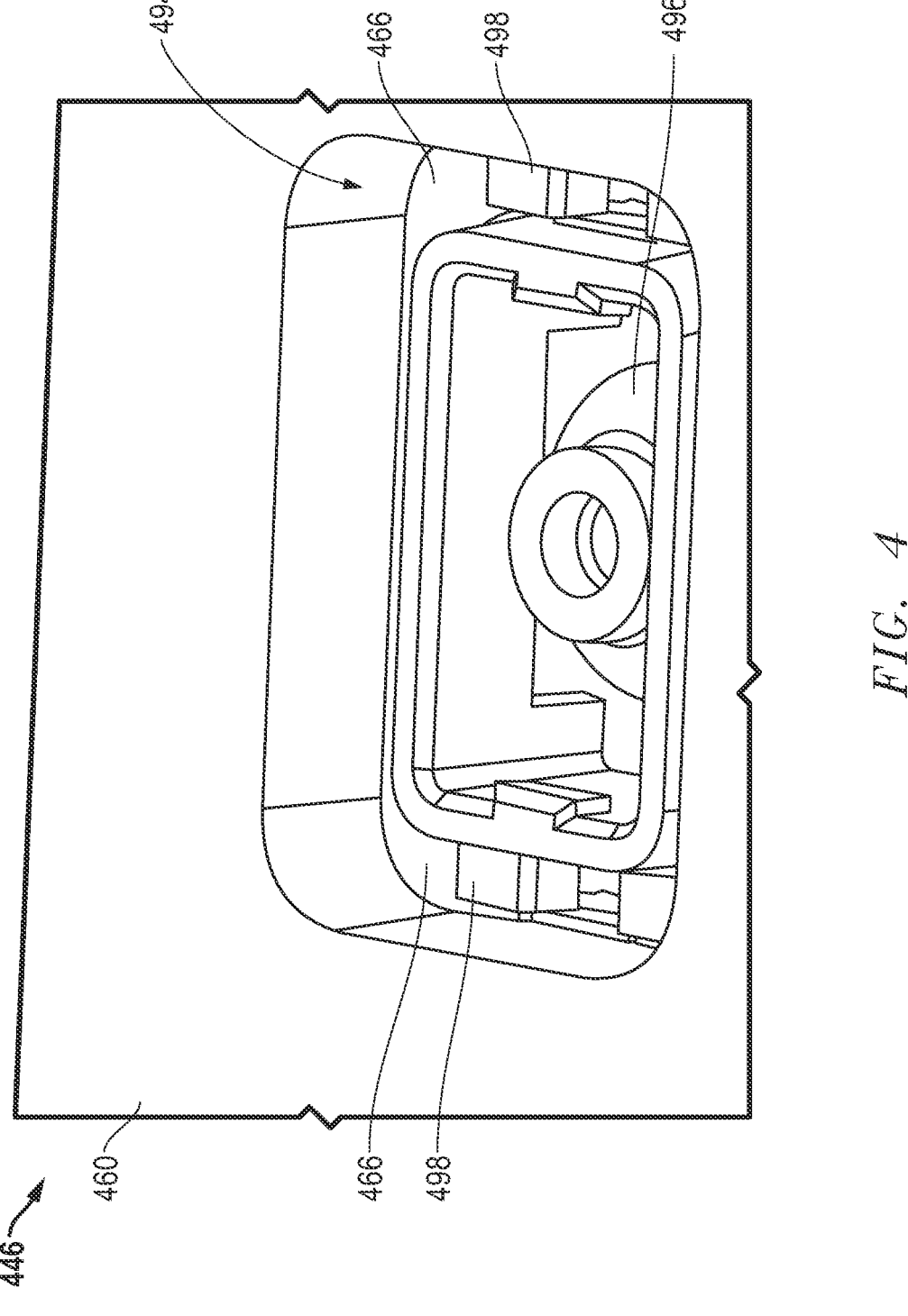
FIG. 4 is a top, perspective view of a portion of a keyboard including a key well at a key location for an input actuator that is a keyboard key according to an embodiment of the present disclosure.

FIG. 4 is a top, perspective view of a portion of a keyboard 446 including a key well at a key location for an input actuator such as a key cap (not shown) according to an embodiment of the present disclosure. FIG. 4 shows a key location for a key cap that includes a key well 494 formed into the keyboard top chassis 460. The key well 494 may be sized to receive the key cap.

The key well 494 further includes a rubber cushion gasket 466. The rubber cushion gasket 466 may be placed under the key cap such that, upon actuation of the key cap by a user, an underside of the key cap contacts the top of the rubber cushion gasket 466. The contact of the key cap to the rubber cushion gasket 466 reduces a noise produced by the actuation of the key cap by the user. Keyboard metal contact 498 may be used to provide a voltage pulse across the electrochromic film layer (not shown) of the key cap. Additionally, the rubber cushion gasket 466 may support the keycap so that its electrochromic film layer and its metal contact leads (not shown) do not contact the keyboard metal contact 498 formed on, for example, a keyboard PCB so that accidental closing of the circuit formed on the keyboard PCB cannot occur until the keycap is actuated.

In an embodiment, a rubber dome 496 is formed in the key well 494. The rubber dome 496 may extend up through the key well 494 so that it can engage with the key cap channel formed on an underside of the key cap as described and shown in FIG. 3A for example. The rubber dome 496 is used to keep the key cap in an unactuated state unless and until a user actuates the key cap. When the user does actuate the key cap, a force applied to the underside of the key cap by the rubber dome 496 is overcome and the key cap 356 travels further into a key well formed in a top keyboard chassis 460 such that the keycap may acuate a key switch below the rubber dome 496 in some embodiments.

Figures 5A, 5B:
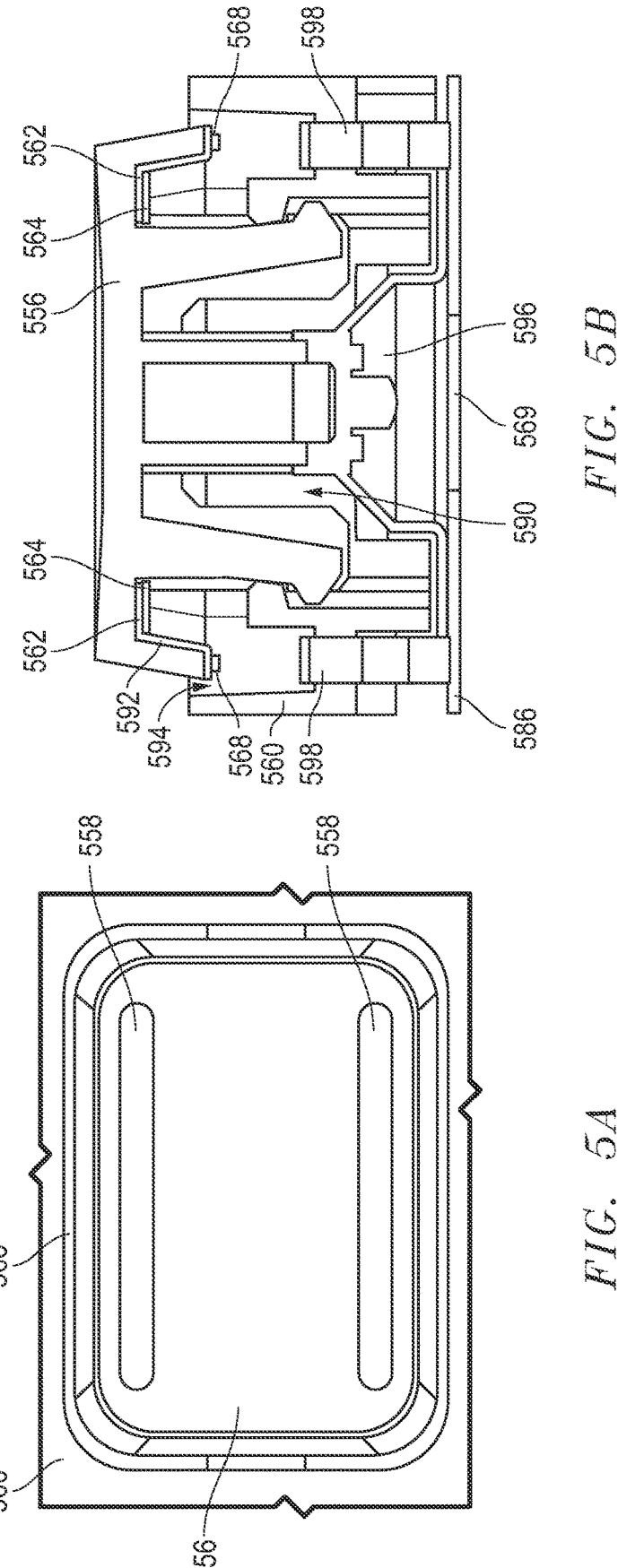
FIG. 5A is a top view of an input actuator that is a keyboard key having an electrochromic film layer and an opaque colored film layer according to another embodiment of the present disclosure.
FIG. 5B is a side cross-sectional view of an input actuator that is a keyboard key having an electrochromic film layer and an opaque colored film layer according to another embodiment of the present disclosure.

FIG. 5A is a top view of an input actuator such as a key cap 556 having an electrochromic film layer and an opaque colored film layer according to another embodiment of the present disclosure. Similarly, FIG. 5B is a side, cross-sectional view of an input actuator such as a key cap 556 having an electrochromic film layer 562 and an opaque colored film layer 564 according to another embodiment of the present disclosure. FIGS. 5A and 5B show the electrochromic film layer 562 in an opaque state for a first functional toggle state and the key cap 556 in an unactuated state.

In an embodiment, the key cap 556 includes a key cap window 558. The key cap window 558 may include, in an embodiment, a hole formed into a portion of the key cap 556 such that a user may see through the key cap 556. In another embodiment, the key cap window 558 may include a portion of the key cap 556 that does not include a color such that it is transparent, and the user can see through the key cap 556. In another embodiment, the key cap window 558 may include a hole through the key cap 556 that has a transparent plastic or glass fitted into the key cap window 558 that, again, allows a user to see through the key cap 556.

In an embodiment, the keyboard key that includes the key cap 556 may be disposed along a portion of a keyboard top chassis 560. As such, the keyboard top chassis 560 may include a key well 594 where a keyboard key is to be disposed such that the key cap 556 may be operatively coupled to the keyboard at the key well 594 formed into the keyboard. It is appreciated that a plurality of keyboard keys may be formed into the keyboard top chassis 560 of the keyboard.

In an embodiment, the key cap 556 may include an electrochromic film layer 562 formed under the key cap 556. In an embodiment, the electrochromic film layer 562 may be any type of electrochromic film that, when a voltage pulse is applied to the electrochromic film, the electrochromic film layer 562 toggles between an opaque state to a transparent state. In an embodiment, the electrochromic film layer 562 may be made of a series of layers that include an ion storage layer (e.g., an electrolyte) and electrochromic layer sandwiched between conductive layers. In some embodiments, the electrochromic layer of the electrochromic film may include any electrochromic material such as a gel substance containing a transition metal oxide such as tungsten trioxide ($WO_3$). Other gel-infused electrochromic materials may include molybdenum (Mo), titanium (T) and niobium (Nb) oxides, among others. As a voltage pulse is applied to the conductive layers of the electrochromic film layer 562, the opacity changes from opaque or non-transparent to a transparent or semi-transparent state or vice-versa. However, because a constant voltage is not necessary to maintain either the opaque state or the transparent state, a single voltage pulse applied to the electrochromic film layer 562 causes the toggling between the opaque state and the transparent state.

In an embodiment, an opaque colored film layer 564 may be placed under the electrochromic film layer 562. During operation, as each voltage pulse is applied to the electrochromic film layer 562 the electrochromic film layer 562 transitions between being opaque and transparent. When the electrochromic film layer 562 is made opaque, a first opaque color is displayed at the key cap window 558. When the electrochromic film layer 562 is made transparent, the user may see through the key cap window 558 formed into the key cap 556, through the now transparent electrochromic film layer 562, and to the opaque colored film layer 564 underneath. This change the opacity of the electrochromic film layer 562, therefore, changes the indicator state of the keyboard key thereby identifying to the user that the toggling has occurred. In an embodiment, the color of the opaque colored film layer 564 may be such so as to identify to the user that the actuation of the key cap 556 has occurred and is different from the color when the electrochromic film layer 562 is made opaque. In an example embodiment, the color of the opaque colored film layer 564 underneath is red. Other prominent colors may be used such that the user may easily distinguish between a first state of the keyboard key (e.g., caps lock activated at a "CapsLk" key) and a second state of the keyboard key (e.g., caps lock not activated at the "CapsLk" key).

In order to provide the voltage pulse to the electrochromic film layer 562, the electrochromic film layer 562 may include one or more metal contact leads 568 formed at terminal ends of electrochromic film extensions 592 formed at the edges of the electrochromic film layer 562 and extending down below a surface of the key cap 556. These metal contact leads 568 may be arranged on an underside surface of the electrochromic film extensions 592 of the electrochromic film layer 562 such that they may contact keyboard metal contacts 598 of a circuit when the user has actuated the key cap 556. In an embodiment, these keyboard metal contacts 598 of the circuit may be formed onto the keyboard PCB 586 in some embodiments such that when the metal contact leads 568 contact the keyboard metal contacts 598 on the keyboard PCB 586, the circuit is closed causing a voltage pulse to pass through the electrochromic film layer 562. Depending on the state of the electrochromic film layer 562, the voltage pulse may switch the electrochromic film layer 562 from an opaque state to a transparent state or visa versa. FIG. 5A shows the electrochromic film layer 562 in an opaque state. A subsequent actuation of the key cap 556 by the user may switch the electrochromic film layer 562 back to the previous state. Again, when the electrochromic film layer 562 is switched from an opaque state to the transparent state, the opaque colored film layer 564 below the electrochromic film layer 562 is made viewable by the user through the key cap window 558 and now transparent electrochromic film layer 562. Key cap 556 may include a key cap channel 590 to receive a rubber dome 596 to mount key cap 556 in key well 594. The keyboard PCB 586 may include a key switch 569 located beneath the rubber dome 596 to detect key actuation in some embodiments. In other embodiments, keyboard metal contacts 598 may close a circuit with contacts 568 to may serve as a key switch on keyboard PCB 586.

Figures 6A, 6B:
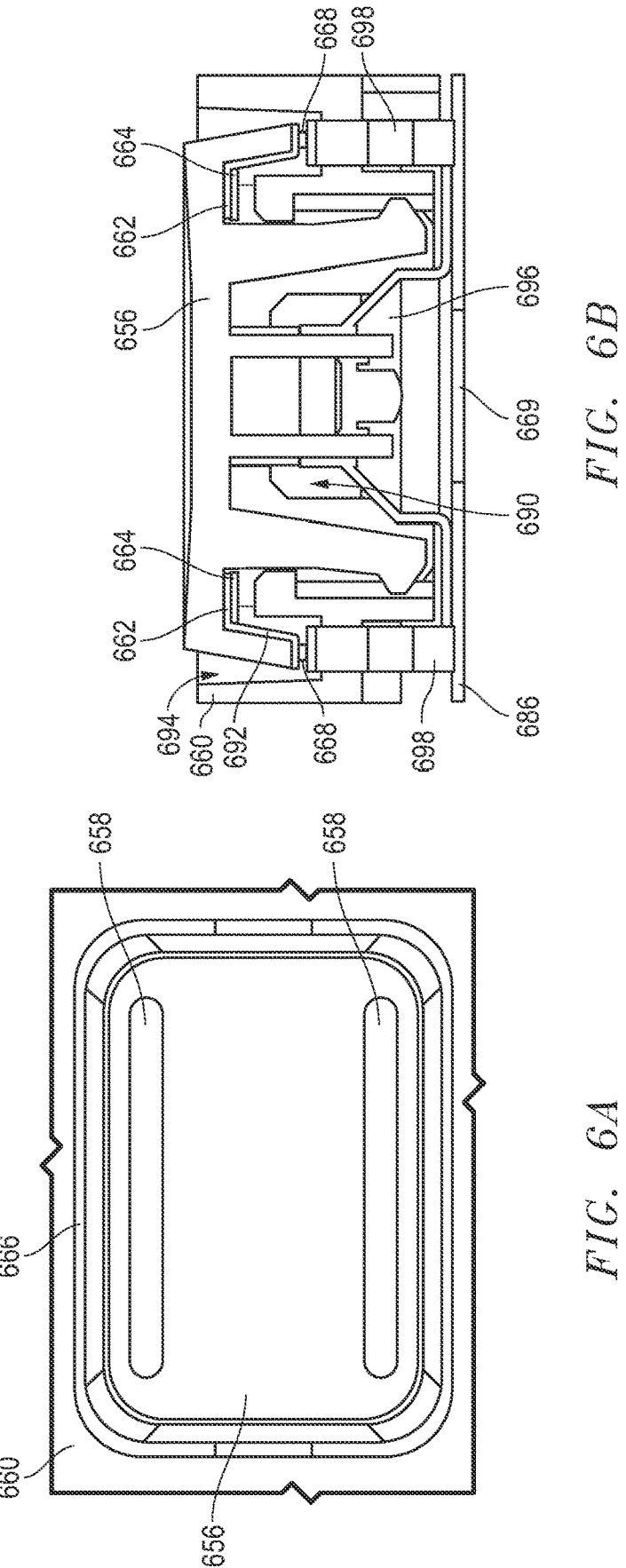
FIG. 6A is a top view of an input actuator that is a keyboard key having an electrochromic film layer and an opaque colored film layer according to another embodiment of the present disclosure.
FIG. 6B is a side cross-sectional view of an input actuator that is a keyboard key having an electrochromic film layer and an opaque colored film layer according to another embodiment of the present disclosure.

FIG. 6A is a top view of an input actuator such as a key cap 556 having an electrochromic film layer and an opaque colored film according to another embodiment of the present disclosure. Similarly, FIG. 6B is a side cross-sectional view of an input actuator such as a key cap 656 having an electrochromic film layer 664 and an opaque colored film 664 according to another embodiment of the present disclosure. FIGS. 5A and 5B show the electrochromic film layer 662 in a transparent state and the key cap 656 in an actuated state. In an embodiment, the actuation of the key cap 656 by the user causes the rubber dome 696 to be forced down and the keycap may actuate a key switch 669 located on keyboard PCB 686.

In an embodiment, the key cap 656 includes a key cap window 658. The key cap window 658 may include, in an embodiment, a hole formed into a portion of the key cap 656 such that a user may see through the key cap 656. In another embodiment, the key cap window 658 may include a portion of the key cap 656 that does not include a color such that it is transparent, and the user can see through the key cap 656. In another embodiment, the key cap window 658 may include a hole through the key cap 656 that has a transparent plastic or glass fitted into the key cap window 658 that, again, allows a user to see through the key cap 656.

In an embodiment, the keyboard key that includes the key cap 656 may be disposed along a portion of a keyboard top chassis 660. As such, the keyboard top chassis 660 may include a key well 694 where a keyboard key is to be disposed such that the key cap 656 may operatively coupled to the keyboard at the key well 694 formed into the keyboard and actuated within the same. Key cap 656 may include key cap channel 690 for receiving the rubber dome 696 to mount the key cap and provide for actuation in key well 694. Actuation of the key cap 656 and rubber dome 696 may cause the key cap 656 extension to actuate a key switch 669 in keyboard PCB 686. It is appreciated that a plurality of keyboard keys may be formed into the keyboard top chassis 660 of the keyboard.

In an embodiment, the key cap 656 may include an electrochromic film layer 662 formed under the key cap 656. In an embodiment, the electrochromic film layer 662 may be any type of electrochromic film that, when a voltage pulse is applied to the electrochromic film, the electrochromic film layer 662 toggles between an opaque state to a transparent state. In an embodiment, the electrochromic film layer 662 may be made of a series of layers that include an ion storage layer (e.g., an electrolyte) and electrochromic layer sandwiched between conductive layers. In some embodiments, the electrochromic layer of the electrochromic film may include any electrochromic material such as a gel substance containing a transition metal oxide such as tungsten trioxide ($WO_3$). Other gel-infused electrochromic materials may include molybdenum (Mo), titanium (T) and niobium (Nb) oxides, among others. As a voltage pulse is applied to the conductive layers of the electrochromic film layer 662, the opacity changes from opaque or non-transparent to a transparent or semi-transparent state. However, because a constant voltage is not necessary to maintain either the opaque state or the transparent state, a single voltage pulse applied to the electrochromic film layer 662 causes the toggling between the opaque state and the transparent state.

In an embodiment, an opaque colored film layer 664 may be placed under the electrochromic film layer 662. During operation, as the voltage pulse is applied to the electrochromic film layer 662 and the electrochromic film layer 662 is made transparent as shown in FIGS. 6A and 6B, the user may see through the key cap window 658 formed into the key cap 656, through the now transparent electrochromic film layer 662, and to the opaque colored film layer 664. This change in the opacity of the electrochromic film layer 662, therefore, changes the indicator state of the key cap 656 thereby identifying to the user that the toggling has occurred. In an embodiment, the color of the opaque colored film layer 664 may be such so as to identify to the user that the actuation of the key cap 656 has occurred. In an example embodiment, the color of the opaque colored film layer 664 is red. Other prominent colors may be used such that the user may easily distinguish between a first state of the keyboard key (e.g., caps lock activated at a "CapsLk" key) and a second state of the keyboard key (e.g., caps lock not activated at the "CapsLk" key).

In order to provide the voltage pulse to the electrochromic film layer 662, the electrochromic film layer 662 may include one or more metal contact leads 668 formed at terminal ends of electrochromic film extensions 692 formed at the edges of the electrochromic film layer 662 and extending down below a surface of the key cap 656. These metal contact leads 668 may be arranged on an underside surface of the electrochromic film extensions 692 of the electrochromic film layer 662 such that they may contact keyboard metal contacts 698 of a circuit when the user has actuated the key cap 656. In an embodiment, these keyboard metal contacts 698 of the circuit may be formed onto the keyboard PCB 686 such that when the metal contact leads 668 contact the keyboard metal contacts 698 on the keyboard PCB 686, the circuit is closed causing a voltage pulse to pass through the electrochromic film layer 662. Depending on the state of the electrochromic film layer 662, the voltage pulse may switch the electrochromic film layer 662 from an opaque state to a transparent state or visa versa. FIG. 6A shows the electrochromic film layer 662 in a transparent state as a result of the contact and electrical coupling of the electrochromic film layer 562 to the voltage source. A subsequent actuation of the key cap 656 by the user may switch the electrochromic film layer 662 back to the previous state such as an opaque state. Again, when the electrochromic film layer 662 is switched from an opaque state to the transparent state, the opaque colored film layer 664 below the electrochromic film layer 662 is made viewable by the user through the key cap window 658 and now transparent electrochromic film layer 662. In one embodiment, contact of keyboard metal contacts 698 by the metal contact leads 668 may serve as a key switch on the keyboard PCB 686. In other embodiments, the key switch 669 may be triggered as described herein.

Figure 7:
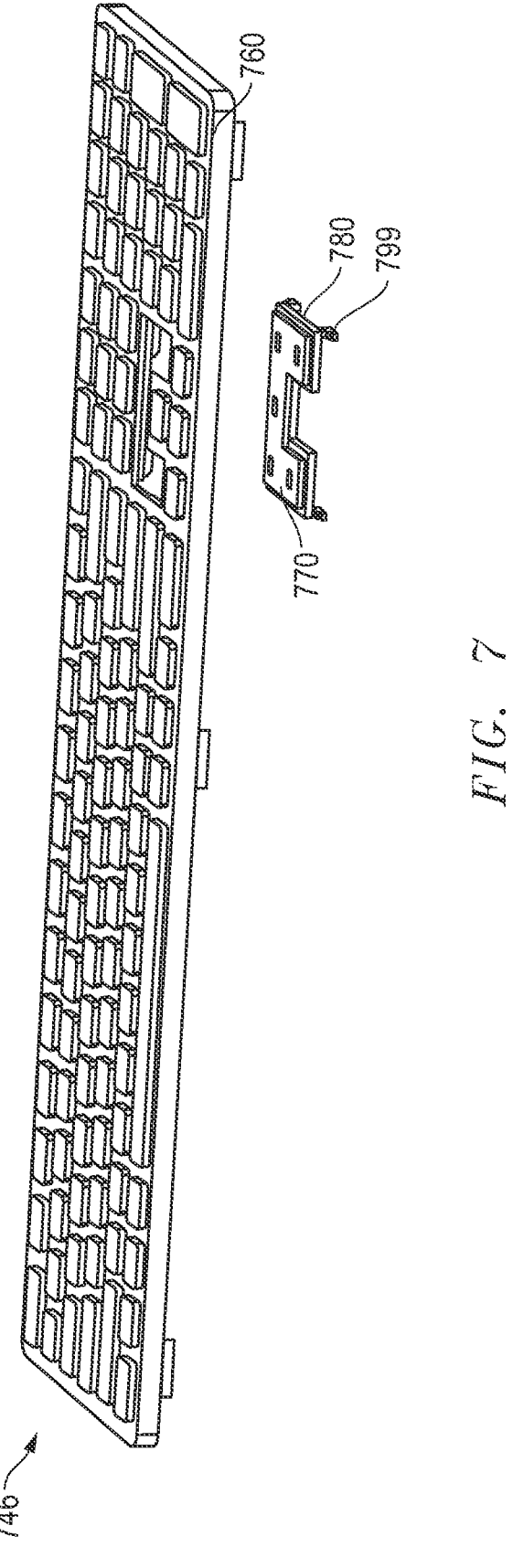
FIG. 7 is a top, perspective view of a keyboard having a plurality of input actuators with an exploded, top view of a subset of input actuators that are touch icons on a touch icon panel according to an embodiment of the present disclosure.

FIG. 7 is a top, perspective view of a keyboard 746 having a plurality of input actuators with an exploded, top view of a plurality of input actuators such as an icon panel and incorporated window 770 according to an embodiment of the present disclosure. In an example embodiment, the icon panel and incorporated window 770 includes an icon panel with a window or transparent portion of the icon panel and incorporated window 770. The window formed into the icon panel and incorporated window 770 may be in the shape of certain touch icons representing the available togglable inputs provided to an information handling system to toggle functions of software or hardware there in an example embodiment. As described herein, these touch icons that form the windows in the icon panel and incorporated window 770 may have the shape of a microphone representing a "mute" or "unmute" button and a video camera representing a video streaming on and off button, among other touch icons. It is appreciated that these are merely examples of touch icons that may be presented on the icon panel and incorporated window 770 that may be incorporated into the keyboard 746, and the present specification contemplates other touch icons that allow a user to toggle input provided at the keyboard 746 from a first state and a second state of function of software or hardware at the information handling system.

In an example embodiment, an icon panel chassis 780 is formed under the icon panel and incorporated window 770 and other layers between in order to support those layers and devices below the icon panel and incorporated window 770 described herein. In an embodiment, the icon panel chassis 780 may include a number of coupling holes 799 that allow a screw, bolt, clips, or other fastening device to pass through in order to secure the icon panel chassis 780 to the keyboard top chassis 760.

Figures 8A, 8B:
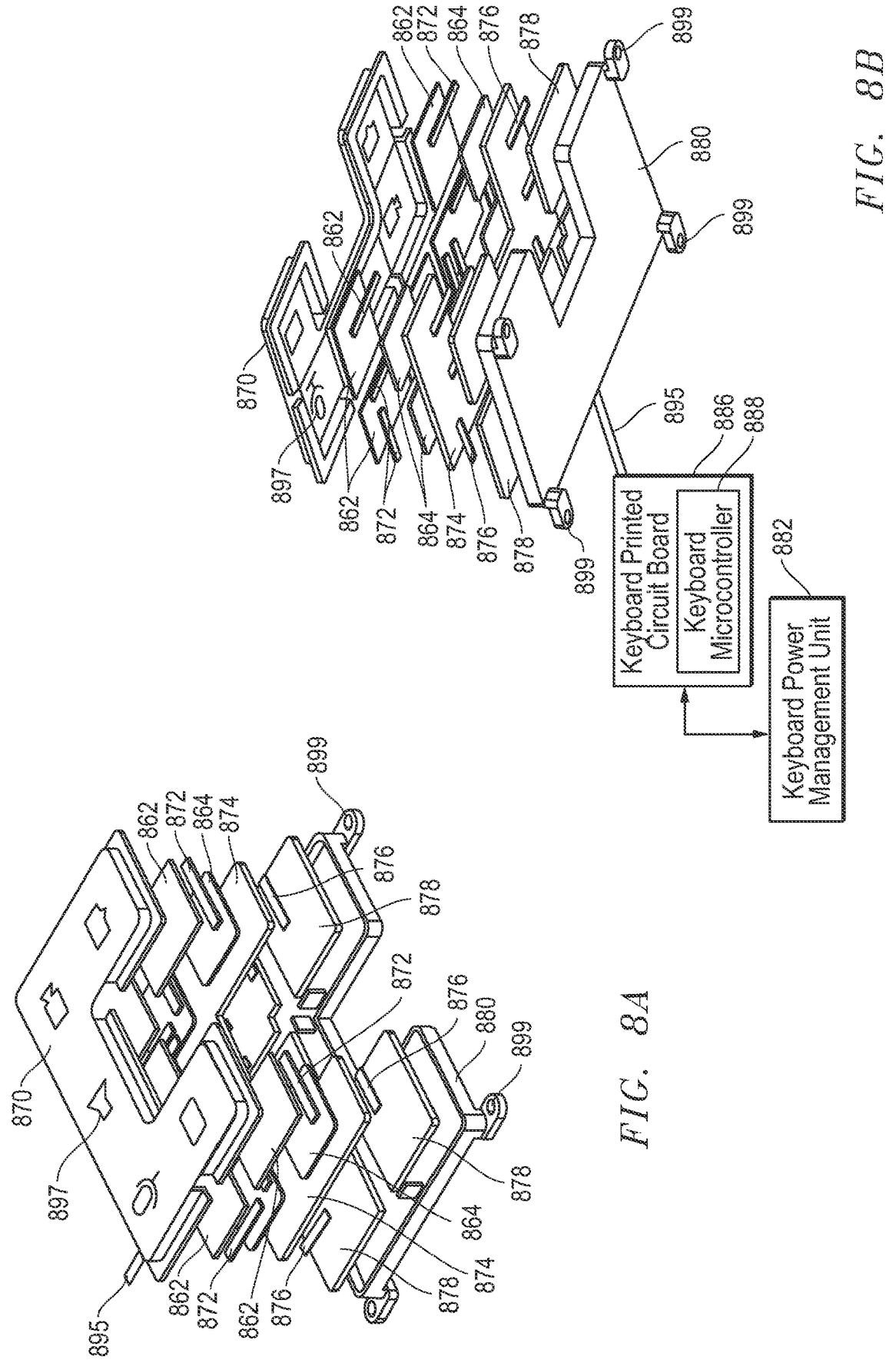
FIG. 8A is a top exploded view of a plurality of input actuators on a touch icon panel of a keyboard including an electrochromic film layer and an opaque colored film layer according to another embodiment of the present disclosure.
FIG. 8B is a bottom exploded view of a plurality of input actuators on a touch icon panel of a keyboard including an electrochromic film layer and an opaque colored film layer according to another embodiment of the present disclosure.

FIG. 8A is a top exploded view of a plurality of input actuators such as an icon panel and incorporated window 870 of a keyboard including an electrochromic film layer

862 and an opaque colored film layer 864 according to another embodiment of the present disclosure. FIG. 8B is a bottom exploded view of a plurality of input actuators such as an icon panel and incorporated window 870 of a keyboard including an electrochromic film layer 862 and an opaque colored film layer 864 according to another embodiment of the present disclosure.

In the example where the input actuator is the icon panel and incorporated window 870 having one or more touch icons 897, the icon panel and incorporated window 870 includes an icon panel with a window or transparent portion of the icon panel and incorporated window 870. The window formed into the icon panel and incorporated window 870 may be in the shape of certain touch icon 897 representing the available togglable inputs provide to an information handling system, in an example embodiment. FIGS. 8A and 8B show an icon panel and incorporated window 870 having five touch icons 897 formed as windows into the icon panel and incorporated window 870 that allow a user to toggle between a plurality of input states. As described herein, these touch icons 897 that form the windows in the icon panel and incorporated window 870 may have the shape of a microphone representing a "mute" or "unmute" button and a video camera representing a video streaming on and off button, a speaker on and off button, share file button, among other touch icons 897. It is appreciated that these are merely examples of touch icons 897 that may be presented as windows on the icon panel and incorporated window 870 that may be incorporated into the keyboard, and the present specification contemplates other touch icons 897 that allow a user to toggle input provided at the keyboard from a first state and a second state for functions in software or hardware at the information handling system.

In an embodiment, an electrochromic film layer 862 may be placed under the icon panel and incorporated window 870. Again, the electrochromic film layer 862 may be any type of electrochromic film that, when a voltage pulse is applied to the electrochromic film, the electrochromic film layer 862 toggles between an opaque state to a transparent state. In an embodiment, the electrochromic film layer 862 may be made of a series of layers that include an ion storage layer (e.g., an electrolyte) and electrochromic layer sandwiched between conductive layers. In some embodiments, the electrochromic layer of the electrochromic film may include any electrochromic material such as a gel substance containing a transition metal oxide such as tungsten trioxide ($WO_3$). Other gel-infused electrochromic materials may include molybdenum (Mo), titanium (T) and niobium (Nb) oxides, among others. As a voltage pulse is applied to the conductive layers of the electrochromic film layer 862, the opacity changes from opaque or non-transparent to a transparent or semi-transparent state. However, because a constant voltage is not necessary to maintain either the opaque state or the transparent state, a single voltage pulse applied to the electrochromic film layer 862 causes the toggling between the opaque state and the transparent state.

In an embodiment, a first conductive layer 872 may be placed under, at least, a portion of the electrochromic film layer 862. In an embodiment, this first conductive layer 872 may be any type of conductive material that conducts a voltage pulse to the electrochromic film layer 862. In an embodiment, the first conductive layer 872 may be a conductive sponge or foam that includes, for example, a solid metal such as aluminum (Al) with gas-filled pores. As seen in FIGS. 8A and 8B, the first conductive layer 872 may be generally coplanar with each of the opaque colored film layers 864 associated with each of the icon windows 897 on the icon panel and incorporated window 870. This coplanar arrangement of the first conductive layer 872 with the opaque colored film layer 864 allows the first conductive layer 872 to electrically couple past the opaque colored film layer 864 to the electrochromic film layer 862 and to electrical traces formed on the icon panel PCB 874 as described herein.

In an embodiment, the opaque colored film layer 864 may also be formed under the electrochromic film layer 862. As described herein, as the voltage pulse is applied to the electrochromic film layer 862 and the electrochromic film layer 862 is made transparent, the user may see through the icon windows 897 formed into the icon panel and incorporated window 870, through the now transparent electrochromic film layer 862, and to the opaque colored film layer 864. This change the opacity of the electrochromic film layer 862, therefore, changes the indicator state of the window for the touch icon 897 on the icon panel and incorporated window 870 thereby identifying to the user that the toggling has occurred. In an embodiment, the color of the opaque colored film layer 864 may be such so as to identify to the user that the actuation of the touch icon 897 and its associated function has occurred. In an example embodiment, the color of the opaque colored film layer 864 is red while the opaque state of the electrochromic film layer 862 is a different color. Other prominent colors may be used such that the user may easily distinguish between a first state of the keyboard key (e.g., mute on) and a second state of the keyboard key (e.g., mute off) and its associated software or hardware function.

In an embodiment, an icon panel PCB 874 may be placed under the first conductive layer 872 and opaque colored film layer 864. In an embodiment, the first conductive layer 872 may be sandwiched between the top surface of the icon panel PCB 874 and the bottom surface of the electrochromic film layer 862. In an embodiment, the icon panel PCB 874 may include electrical traces that operatively and electrically couples the icon panel PCB 874, through the first conductive layer 872, and to the electrochromic film layer 862.

In an embodiment, the electrical traces may pass through the icon panel PCB 874 such that the electrical traces on the top surface of the icon panel PCB 874 are electrically coupled to electrical traces formed on a bottom surface of the icon panel PCB 874. This allows a second conductive layer 876 to be operatively coupled to these electrical traces formed on the bottom surface of the icon panel PCB 874. Like the first conductive layer 872, the second conductive layer 876 may be an electrically conductive sponge or foam. Thus, an electrical circuit is created from the second conductive layer 876, through the icon panel PCB 874 via the electrical traces formed on and through the top and bottom surfaces of the icon panel PCB 874, through the first conductive layer 872, and to the electrochromic film layer 862.

In an embodiment, a piezoelectric actuator layer 878 is formed under the second conductive layer 876 and icon panel PCB 874. The piezoelectric actuator layer 878 includes a piezoelectric material that, when force is applied to the piezoelectric material when a user actuates the icon panel and incorporated window 870, a voltage is created. The voltage created at each piezoelectric actuator layer 878 is conducted through the second conductive layer 876, through the electrical traces formed on and through the icon panel PCB 874, through the first conductive layer 872 and into a corresponding section of the electrochromic film layer 862 for a particular touch icon 897 in order to change the opacity of the electrochromic film layer 862 for that touch icon 897 as described herein. Each touch icon 897 of the icon panel and incorporated window 870 may have its own corresponding piezoelectric actuator layer 878, electrochromic film layer 862, and separate circuit in between such that actuation with a press of each touch icon 897 only toggles that touch icon 897. Further, actuation of the corresponding piezoelectric actuator layer 878 for a particular touch icon 897 is detected at the keyboard printed circuit board by the keyboard microcontroller 888 as a functional actuation of that touch icon 897 in embodiments herein.

In an embodiment, an icon panel chassis 880 is formed under the piezoelectric actuator layer 878 in order to support those layers and devices below the icon panel and incorporated window 870 described herein. In an embodiment, the icon panel chassis 880 may include a number of coupling holes 899 that allow a screw, bolt, clip, latch, or other fastening device to pass through in order to secure the icon panel chassis 880 to the keyboard top chassis (e.g., 760, FIG. 7).

In an embodiment, an electrical lead 895 may be operatively coupled from the piezoelectric actuator layer 878 to the keyboard microcontroller 888. The electrical lead 895 may be operatively coupled to a general-purpose input/output (GPIO) port of the keyboard microcontroller 888 so that the voltage created by the deformation of any given piezoelectric actuator layer 878 may be detected at the keyboard microcontroller 888. The detection of the voltage output from the piezoelectric actuator layer 878 allows the keyboard microcontroller 888 to receive a functional toggle state for a software or hardware function controller by a touch icon 897 that corresponds to a current state of the electrochromic film layer 862. Again, in an embodiment, the keyboard microcontroller 888 may be provided with an initial toggle functional state of the touch icon 897 corresponding to the electrochromic film layer 862 state (e.g., opaque or transparent) and, accordingly, the state of the touch icon 897 toggle functional state may be correctly provided to the information handling system. For example, the keyboard microcontroller 888 may be provided with an initial toggle functional state corresponding to the electrochromic film layer 862 state (e.g., opaque) displayed when a mute touch icon is not active and monitor, via the voltage output from the deformation of the piezoelectric actuator layer 878, when the toggle functional state has been changed and the electrochromic film layer 862 has switched from an opaque to a transparent state indicative of the "mute" touch icon of the plurality of touch icons 897 activating the mute function on a microphone at the information handling system. The touch icon 897 for mute shown on the icon panel and incorporated window 870 may be actuated or toggled so that the keyboard microcontroller 888 may selectively mute and unmute a microphone at the information handling system and show a corresponding state at the touch icon based on the electrochromic film layer 862 state of opaque or transparent.

The keyboard may further include a keyboard PCB 886. As described herein, the keyboard PCB 886 may be used to house the keyboard microcontroller 888 as well as other electrical circuits and hardware (e.g., keyboard PMU 882). This allows the keyboard microcontroller 888 to be operatively coupled to the keyboard PMU 882 via electrical traces and other circuitry formed on the keyboard PCB 886.

Figure 9:
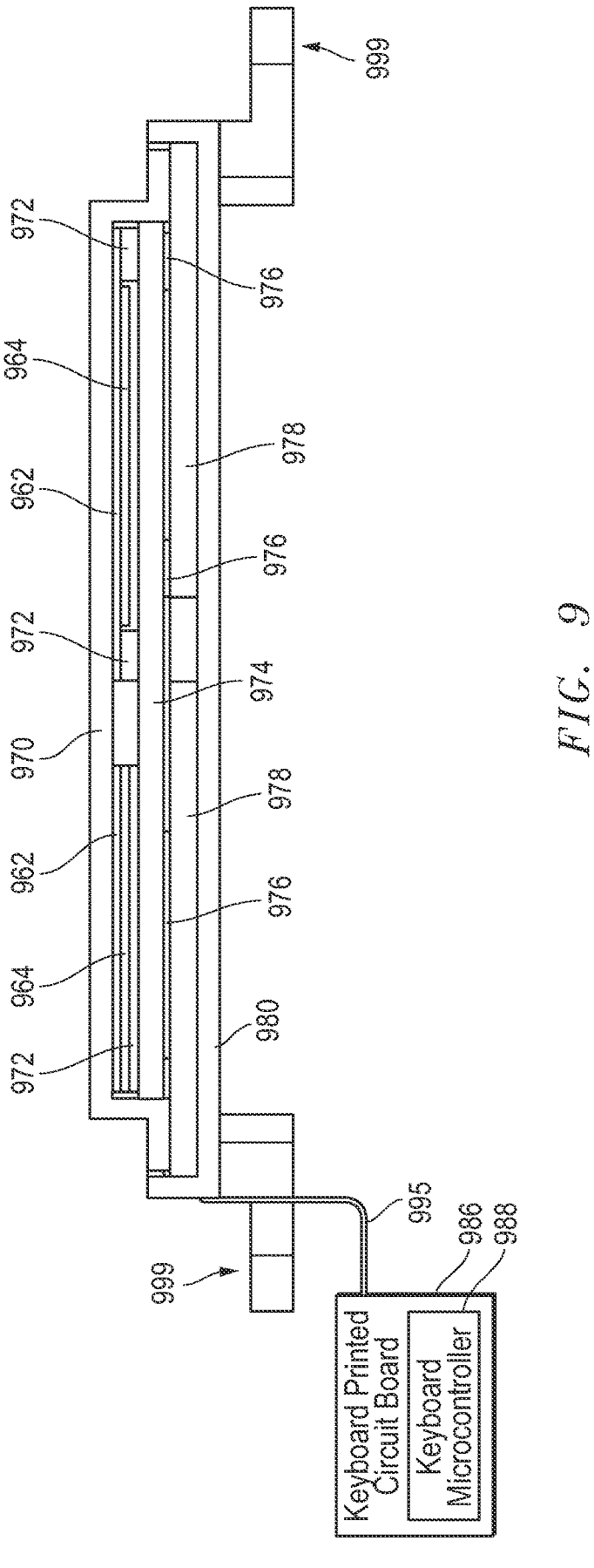
FIG. 9 is a side cross-sectional view of an input actuator on a touch icon panel having an electrochromic film layer and an opaque colored film layer according to another embodiment of the present disclosure.

FIG. 9 is a side cross-sectional view of an input actuator such as an icon panel and incorporated window 970 with one or more touch icons having an electrochromic film layer 962 and an opaque colored film layer 964 according to another embodiment of the present disclosure. In the example where the input actuator is a touch icon of the icon panel and incorporated window 970 as shown in FIG. 9, the icon panel and incorporated window 970 includes an icon panel with a window or transparent portion of the icon panel and incorporated window 970 that serves as the touch icon. FIG. 9 has two touch icons in the cross section. The window formed into the icon panel and incorporated window 970 may be in the shape of certain touch icon (not shown in the cross section) representing the available togglable functional inputs provided to an information handling system, in an example embodiment. As described herein, these touch icons that form the windows in the icon panel and incorporated window 970 may have the shape of a microphone representing a "mute" button, and a video camera representing a video streaming on and off button, for example, among other icon windows. It is appreciated that these are merely examples of touch icon window shapes that may be presented on the icon panel and incorporated window 970 that may be incorporated into the keyboard, and the present specification contemplates other touch icons that allow a user to toggle functional input provided at the keyboard from a first state and a second state for a function of software or hardware at the information handling system.

In an embodiment, an electrochromic film layer 962 may be placed under the icon panel and incorporated window 970. Each touch icon of the icon panel and incorporated window 970 may have its own electrochromic film layer 962 portion. Again, the electrochromic film layer 962 may be any type of electrochromic film that, when a voltage pulse is applied to the electrochromic film, the electrochromic film layer 962 toggles between an opaque state to a transparent state. In an embodiment, the electrochromic film layer 862 may be made of a series of layers that include an ion storage layer (e.g., an electrolyte) and electrochromic layer sandwiched between conductive layers. In some embodiments, the electrochromic layer of the electrochromic film may include any electrochromic material such as a gel substance containing a transition metal oxide such as tungsten trioxide ($WO_3$). Other gel-infused electrochromic materials may include molybdenum (Mo), titanium (T) and niobium (Nb) oxides, among others. As a voltage pulse is applied to the conductive layers of the electrochromic film layer 962, the opacity changes from opaque or non-transparent to a transparent or semi-transparent state. However, because a constant voltage is not necessary to maintain either the opaque state or the transparent state, a single voltage pulse applied to the electrochromic film layer 962 causes the toggling between the opaque state and the transparent state.

In an embodiment, a first conductive layer 972 may be placed under, at least, each separate portion of the electrochromic film layer 962 for each touch icon. In an embodiment, this first conductive layer 972 may be any type of conductive material that conducts a voltage pulse to the electrochromic film layer 962. In an embodiment, the first conductive layer 972 may be a conductive sponge or foam that includes, for example, a solid metal such as aluminum (Al) with gas-filled pores. As seen in FIG. 9, the first conductive layer 972 may be generally coplanar with each of the opaque colored film layers 964 associated with each of the touch icons on the icon panel and incorporated window 970. This coplanar arrangement of the first conductive layer 972 with the opaque colored film layer 964 allows the first conductive layer 972 to electrically couple the electrochromic film layer 962 to electrical traces formed on the icon panel PCB 974 for a particular touch icon as described herein.

In an embodiment, the opaque colored film layer 964 is formed under the electrochromic film layer 962. As described herein, as the voltage pulse is applied to the electrochromic film layer 962, the electrochromic film layer 962 is made transparent such that the user may see through the touch icon windows formed into the icon panel and incorporated window 970, through the now transparent electrochromic film layer 962, and to the opaque colored film layer 964. This change the opacity of the electrochromic film layer 962, therefore, changes the indicator state of the touch icon viewable through its windows on the icon panel and incorporated window 970 thereby identifying to the user that the toggling has occurred. In an embodiment, the color of the opaque colored film layer 964 may be such so as to identify to the user that the actuation of the touch icon has occurred. In an example embodiment, the color of the opaque colored film layer 964 is red while an opaque state of the electrochromic film layer 962 may be a different color. Other prominent colors may be used such that the user may easily distinguish between a first state of the keyboard key (e.g., mute on) and a second state of the keyboard key (e.g., mute off).

In an embodiment, an icon panel PCB 974 may be placed under the first conductive layer 972 and opaque colored film layer 964. In an embodiment, separate first conductive layers 972 may be sandwiched between the top surface of the icon panel PCB 974 and the bottom surface of each electrochromic film layer 962 for each touch icon. In an embodiment, the icon panel PCB 974 may include electrical traces that operatively and electrically couples the icon panel PCB 974, through the first conductive layer 972, and to the electrochromic film layer 962.

In an embodiment, the electrical traces may pass through the icon panel PCB 974 such that the electrical traces on the top surface of the icon panel PCB 974 are electrically coupled to electrical traces formed on a bottom surface of the icon panel PCB 974. This allows a second conductive layer 976 to be operatively coupled to these electrical traces formed on the bottom surface of the icon panel PCB 974 for each touch icon. Like the first conductive layer 972, the second conductive layer 976 may be an electrically conductive sponge or foam. Thus, an electrical circuit is created from the second conductive layer 976, through the icon panel PCB 974 via the electrical traces formed on and through the top and bottom surfaces of the icon panel PCB 974, through the first conductive layer 972, and to the electrochromic film layer 962 for each touch icon.

In an embodiment, a piezoelectric actuator layer 978 is formed under the second conductive layer 976 and icon panel PCB 974 for each touch icon. Each piezoelectric actuator layer 978 includes a piezoelectric material that, when force is applied to the piezoelectric material on the corresponding touch icon when a user actuates the icon panel and incorporated window 970, a voltage is created for that touch icon. The voltage pulse created at the piezoelectric actuator layer 978 for the actuated touch icon is conducted through the second conductive layer 976, through the electrical traces formed on and through the icon panel PCB 974, through the first conductive layer 972 and into the electrochromic film layer 962 for the actuated touch icon in order to change the opacity of the electrochromic film layer 962 as described herein. Because a constant voltage is not necessary to maintain either the opaque state or the transparent state, a single voltage pulse applied to the electrochromic film layer 962 causes the toggling between the opaque state and the transparent state thereby eliminating the need of a constant power source such as from a battery (dry cell or rechargeable) or an A/C power source.

In an embodiment, an icon panel chassis 980 is formed under the piezoelectric actuator layer 978 in order to support those layers and devices below the icon panel and incorporated window 970 described herein. In an embodiment, the icon panel chassis 980 may include a number of coupling holes 999 that allow a screw, bolt, clip, latch, or other fastening device to pass through in order to secure the icon panel chassis 980 to the keyboard top chassis (e.g., 760, FIG. 7).

In an embodiment, an electrical lead 995 may be operatively coupled from the piezoelectric actuator layer 978 for each touch icon to the keyboard microcontroller 988. The electrical lead 995 may be operatively coupled to a general-purpose input/output (GPIO) port of the keyboard microcontroller 988 so that the voltage created by the deformation of each of the piezoelectric actuator layer 978 may be detected at the keyboard microcontroller 988 as actuation of toggling function input corresponding to that touch icon. The detection of the voltage output from the piezoelectric actuator layer 978 for a touch icon allows the keyboard microcontroller 988 to determine a current functional state for a function of software or hardware at the information handling system associated with that touch icon. The current functional state may be reflected by the opaque or transparent state of the electrochromic film layer 962. Again, in an embodiment, the keyboard microcontroller 988 may be provided with an initial functional state corresponding to the state of the electrochromic film layer 962 (e.g., opaque or transparent). The keyboard microcontroller 988 may determine the functional state of the software or hardware function associated with a touch icon is changed. The state of the electrochromic film layer 962 is likewise changed to reflect the toggling of function. Accordingly, the functional toggle state of the touch icon at the icon panel and incorporated window 970 is provided to the information handling system and an indication of the same may be provided correctly with the opaque or transparent state of the electrochromic film layer 962. For example, the keyboard microcontroller 988 may be provided with an initial functional state of the touch icon when a mute icon is not active that is reflected in an initial state of the electrochromic film layer 962 (e.g., opaque). The keyboard microcontroller 988 may monitor, via the voltage output from the deformation of the piezoelectric actuator layer 978 for a particular touch icon actuation that corresponds to when the electrochromic film layer 962 has switched from an opaque to a transparent state indicative of mute being activated and the "mute" touch icon indicating the mute function being on as shown on the icon panel and incorporated window 970 so that the keyboard microcontroller 988 may selectively mute and unmute a microphone at the information handling system via a corresponding touch icon.

The keyboard may further include a keyboard PCB 986. As described herein, the keyboard PCB 986 may be used to operatively couple the keyboard microcontroller 988 as well as other electrical circuits and hardware (e.g., keyboard PMU 982). This allows the keyboard microcontroller 988 to be operatively coupled to the keyboard PMU 982 via electrical traces and other circuitry formed on the keyboard PCB 986.

Figure 10:
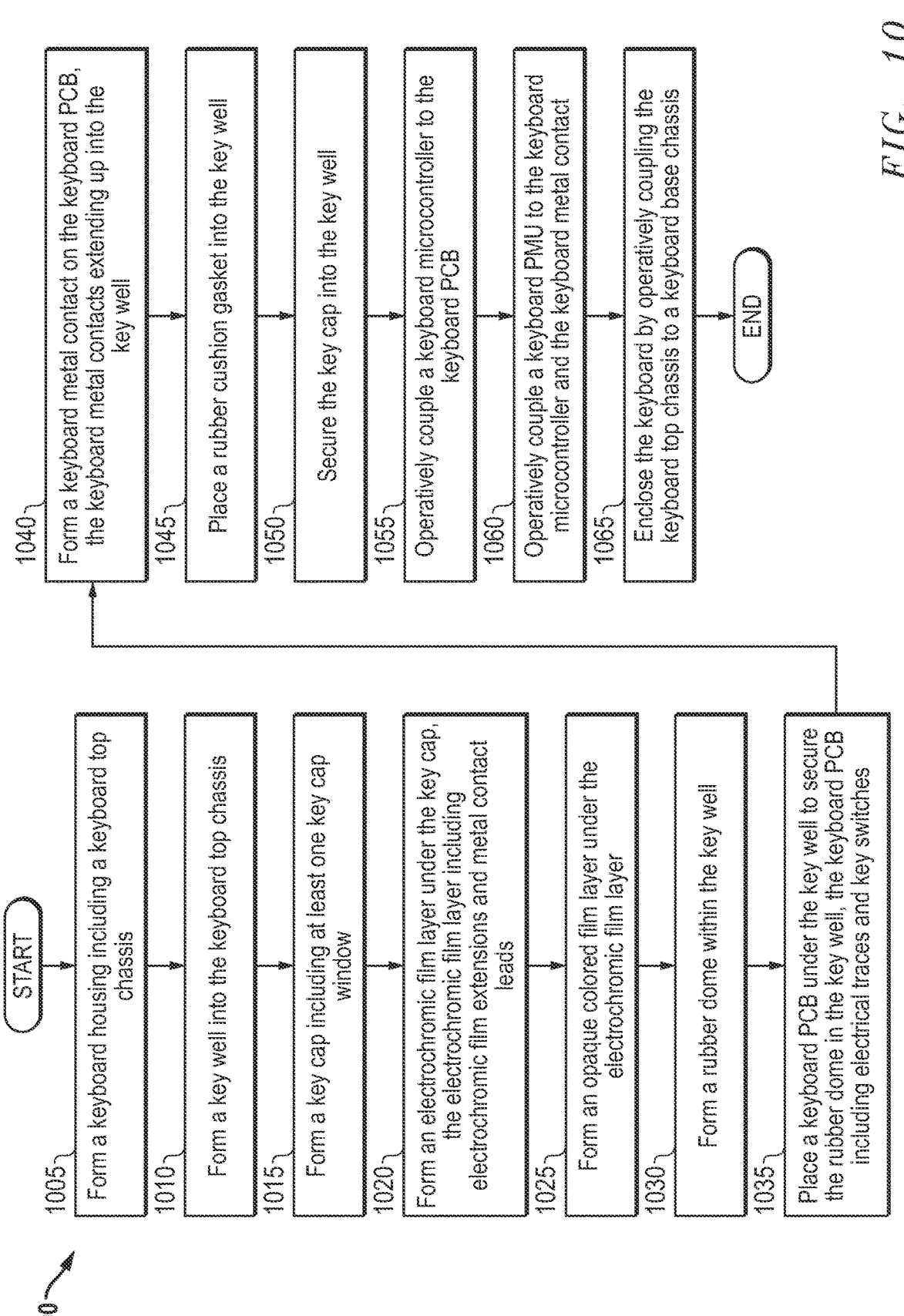
FIG. 10 is a flow diagram illustrating a method of manufacturing a keyboard with an input actuator such as a keyboard key having a key cap with an electrochromic film layer and an opaque colored film according to an embodiment of the present disclosure.

FIG. 10 is a flow diagram illustrating a method 1000 of manufacturing a keyboard with an input actuator such as a keyboard key having a key cap with an electrochromic film layer and an opaque colored film according to an embodiment of the present disclosure. As described herein, the input actuator may include any device that a user may actuate to provide input via the keyboard to the information handling system. As such, in the context of FIG. 10, an input actuator may include a keyboard key that includes a key cap.

At block 1005, the method 1000 includes forming a keyboard housing including a keyboard top chassis. As described herein, the keyboard may be any type of keyboard such as a built-in keyboard on a laptop-type information handling system or a wired or wireless keyboard that includes its own housing including the keyboard top chassis.

The method 1000 also includes, at block 1010, forming a key well into the keyboard top chassis. This key well may be sized to receive a key cap and may contain several components of the key including a key switch and rubber dome for the key as described herein. In some embodiments, the keyboard key of the present embodiments is a toggle-type keyboard key and the location of the key well may be outside an area of a QWERTY-type keyboard such as at a top edge of the keyboard as would be for a function key.

At block 1015, the method 1000 includes forming a key cap including at least one key cap window therein. The key cap may include a window formed therein that allows a user to see through the key cap. Example keyboard keys that may be identified using the key cap may include, for example, a "CapsLk" or caps lock key, a "FnLock" or function lock key, and a "Num Lock" or number lock key, among others. The key cap window may include, in an embodiment, a hole or aperture formed into a portion of the key cap such that a user may see through the key cap. In another embodiment, the key cap window may include a portion of the key cap that does not include a color such that it is transparent, and the user can see through the key cap. In another embodiment, the key cap window may include a hole through the key cap that has a transparent plastic or glass fitted into the key cap window that, again, allows a user to see through the key cap.

The method 1000 includes forming an electrochromic film layer under the key cap wherein the electrochromic film layer includes electrochromic film extensions and metal contact leads at block 1020. In an embodiment, the electrochromic film layer may be any type of electrochromic film that, when a voltage pulse is applied to the electrochromic film, the electrochromic film layer toggles between an opaque state to a transparent state. In an embodiment, the electrochromic film layer may be made of a series of layers that include an ion storage layer (e.g., an electrolyte) and electrochromic layer sandwiched between conductive layers. In some embodiments, the electrochromic layer of the electrochromic film may include any electrochromic material such as a gel substance containing a transition metal oxide such as tungsten trioxide ($WO_3$). Other gel-infused electrochromic materials may include molybdenum (Mo), titanium (T) and niobium (Nb) oxides, among others. As a voltage pulse is applied to the conductive layers of the electrochromic film layer, the opacity changes from opaque or non-transparent to a transparent or semi-transparent state. However, because a constant voltage is not necessary to maintain either the opaque state or the transparent state, a single voltage pulse applied to the electrochromic film layer causes the toggling between the opaque state and the transparent state.

In the embodiments such as those shown in FIGS. 3A and 3B, for example, the metal contact leads are formed on terminal ends of electrochromic film extensions that extend the electrochromic film layer downward and below a bottom surface of the key cap. These metal contact leads may be arranged on an underside surface of the electrochromic film extensions of the electrochromic film layer such that they may contact a circuit when the user has actuated the key cap. In an embodiment, this circuit may be formed onto a keyboard PCB such that when the metal contact leads contact the circuit on the keyboard PCB, the circuit is closed causing a voltage pulse to pass through the electrochromic film layer. Depending on the state of the electrochromic film layer, the voltage pulse may switch the electrochromic film layer from an opaque state to a transparent state or visa versa. A subsequent actuation of the key cap by the user may cause a subsequent voltage pulse to switch the electrochromic film layer back to the previous state.

At block 1025, the method 1000 further includes forming an opaque colored film layer under the electrochromic film layer. Again, as a voltage pulse is applied to the electrochromic film layer and the electrochromic film layer is made transparent thereby allowing the user to see through the key cap window formed into the key cap, through the now transparent electrochromic film layer, and to the opaque colored film layer. This change the opacity of the electrochromic film layer, therefore, changes the indicator state of the keyboard key thereby identifying to the user that the toggling has occurred. In an embodiment, the color of the electrochromic film layer when it is in an opaque state is different than the color of the opaque colored film layer when the electrochromic film layer is transparent so as to identify to the user that the actuation of the key cap has occurred and a functional toggle state of the function associated with the key. In an example embodiment, the color of the opaque colored film layer is red and the color of the electrochromic film layer when it is in an opaque state is a different color. Other prominent colors may be used such that the user may easily distinguish between a first state of the keyboard key (e.g., caps lock activated at a "CapsLk" key) and a second state of the keyboard key (e.g., caps lock not activated at the "CapsLk" key).

At bock 1030, the method of manufacturing a keyboard includes forming a rubber dome within the key well. The rubber dome is used, in an example embodiment, to keep the key cap in an unactuated state unless and until a user actuates the key cap. When the user does actuate the key cap, a force applied to the underside of the key cap by the rubber dome is overcome and the key cap travels further into a key well formed in a top keyboard chassis.

The method 1000 further includes placing a keyboard PCB under the key well to secure the rubber dome in the key well over a key switch on the keyboard PCB. In an embodiment, the keyboard PCB includes electrical traces used to detect actuation of the key and key switch and other traces to conduct a voltage to the electrochromic film layer. In an embodiment, the keyboard PCB may be a keyboard PCB used to receive actuation input from key switches for the keyboard keys when actuated by the user.

At block 1040, the method 1000 includes forming a keyboard metal contact on the keyboard PCB such that the keyboard metal contacts extend up into the key well. As described herein, the keyboard metal contacts formed on the keyboard PCB are arranged on the keyboard PCB such that they contact the metal contact leads formed on the electrochromic film extensions when a key is pressed down to an actuated state. This is done so that the metal contact leads on the electrochromic film extensions may contact keyboard metal contacts on the keyboard PCB forming a circuit. In an embodiment, these keyboard metal contacts of the circuit formed on the keyboard PCB may be formed onto the keyboard PCB such that when the metal contact leads contact the keyboard metal contacts on the keyboard PCB, the circuit is closed causing a voltage pulse to pass through the electrochromic film layer. Further, the key cap may press down the rubber dome and actuate a key switch disposed below the rubber dome to actuate the key and toggle the functional state of the keyboard key. Depending on the state of the electrochromic film layer, the voltage pulse may switch the electrochromic film layer from an opaque state to a transparent state or vice versa as an indicator of the functional state of the software or hardware function controlled by the keyboard key. A subsequent actuation of the key cap by the user may switch the electrochromic film layer back to the previous state due to metal contact leads again contacting the keyboard metal contacts on the keyboard PCB. Again, when the electrochromic film layer is switched from an opaque state to the transparent state, the opaque colored film layer below the electrochromic film layer is made viewable by the user through the key cap window and now transparent electrochromic film layer.

The method 1000 further includes, at block 1045, placing a rubber cushion gasket into the key well. The rubber cushion gasket may be placed under the key cap such that, upon actuation of the key cap by a user, an underside of the key cap contacts the top of the rubber cushion gasket. The contact of the key cap to the rubber cushion gasket reduces a noise produced by the actuation of the key cap by the user. Additionally, the rubber cushion gasket may electrically isolate the electrochromic film layer and its metal contact leads in an unactuated state of the key from the electrical contacts formed on, for example, a keyboard PCB so that accidental closing of the circuit formed on the keyboard PCB does not occur.

At block 1050, the key cap may be secured into the key well. In an embodiment, the rubber dome may be inserted into a key cap channel in the key cap to secure the key cap on the rubber dome in the key well. In another embodiment, the key cap may include key cap hooks that interface with key well hooks that mechanically secure the key cap into the key well when the key cap is pressed into the key well. This allows the key cap to move freely within the key well for actuation but does not allow the key cap to be removed from the key well without force.

The method 1000 further includes, at block 1055, operatively coupling a keyboard microcontroller to the keyboard PCB. The keyboard microcontroller may be operatively coupled to the keyboard PCB as well as operatively coupled to the key switches thereon. In an embodiment, the keyboard microcontroller may be operatively coupled to the keyboard metal contact and the circuit formed thereon. In an embodiment, a keyboard microcontroller is formed on a keyboard PCB and may be operatively coupled to the keyboard PMU at block 1060. As the keyboard PMU detects a key switch actuation, a voltage pulse is sent through the electrochromic film layer. The keyboard microcontroller may be provided with an initial state of actuation of the key for the toggle function of software or hardware associated with that key and which is reflected by the state of the electrochromic film layer (e.g., opaque or transparent). The state of the electrochromic film layer showing on the key cap may accurately indicate the corresponding the functional state of the togglable key such that input to the information handling system may be provided correctly.

At block 1065, the keyboard is enclosed by operatively coupling the keyboard top chassis to a keyboard bottom chassis. This encloses the rubber cushion gasket, metal contact leads, keyboard PCB, rubber dome, keyboard metal contacts, keyboard PMU, and keyboard microcontroller and any other keyboard components within the housing of the keyboard. At this point, the method 1000 may end.

Figure 11:
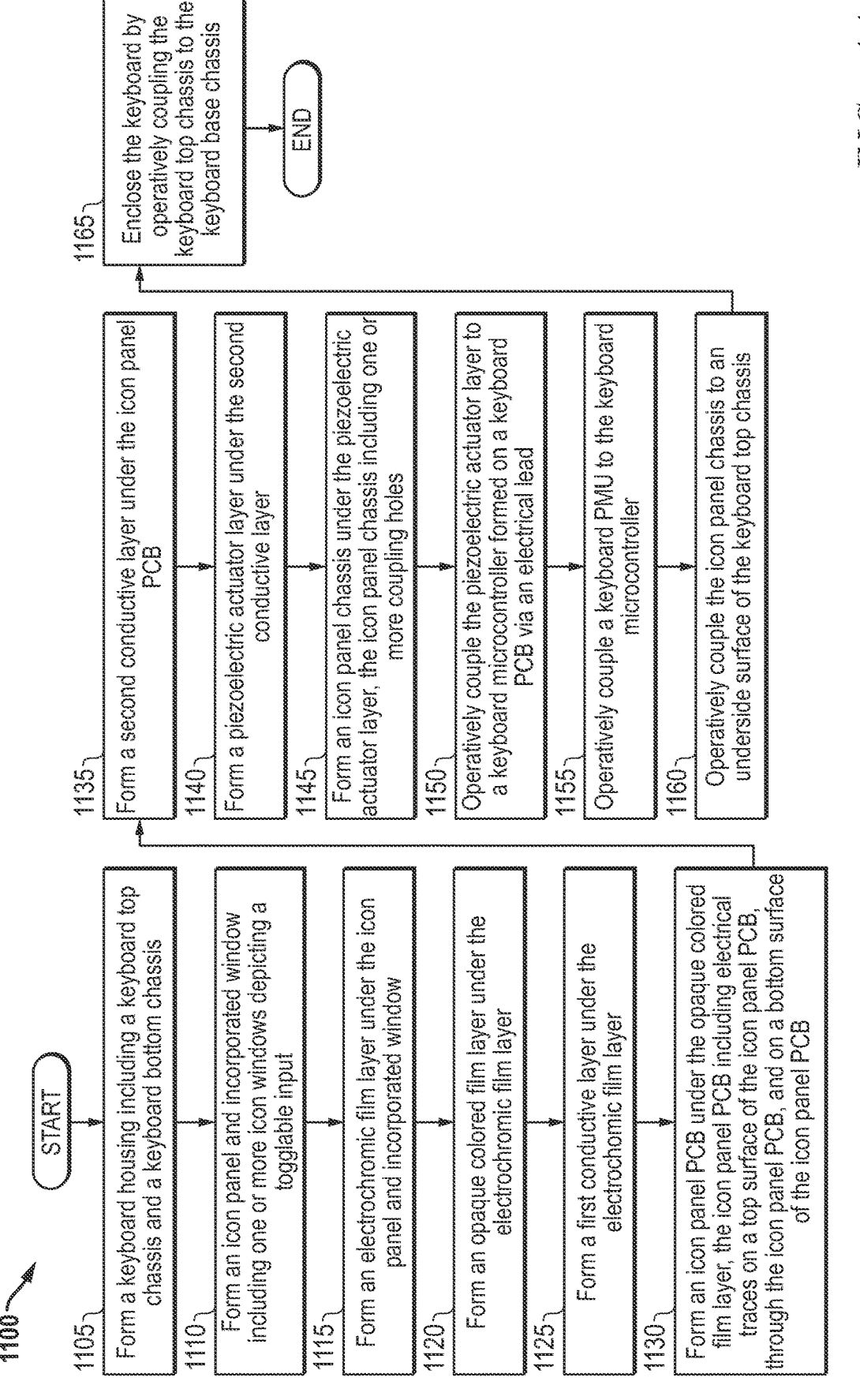
FIG. 11 is a flow diagram illustrating a method of manufacturing a keyboard with an input actuator such as an icon panel and incorporated window on a touch icon panel with an electrochromic film layer and an opaque colored film according to another embodiment of the present disclosure.

FIG. 11 is a flow diagram illustrating a method 1100 of manufacturing a keyboard with an input actuator such as an icon panel and incorporated window having one or more touch icons with an electrochromic film layer and an opaque colored film according to another embodiment of the present disclosure. As described herein, the input actuator may include any device that a user may actuate to provide input via the keyboard to the information handling system. As such, in the context of FIG. 11, an input actuator may include an icon panel and incorporated window with one or more touch icons as described herein.

At block 1105, the method 1100 includes forming a keyboard housing including a keyboard top chassis and a keyboard bottom chassis. In an embodiment, the icon panel and incorporated window is operatively coupled to an underside of the keyboard top chassis such that, when assembled, the icon panel and incorporated window are accessible through a hole formed in the keyboard top chassis. Other components of the icon panel and incorporated window are enclosed within the keyboard chassis.

At block 1110, the method 1100 includes forming an icon panel and incorporated window including one or more touch icons having windows depicting a togglable input for a software or hardware function at the information handling system. In an example embodiment, the icon panel and incorporated window includes an icon panel with a window or transparent portion of the icon panel and incorporated window serving to identify a location of a touch icon. The window formed into the icon panel and incorporated window may be in the shape of certain touch icons representing the available togglable function inputs provided to an information handling system, in an example embodiment. FIGS. 8A and 8B, for example, show an icon panel and incorporated window having five touch icons with windows formed into the icon panel and incorporated window that allow a user to toggle between a plurality of input states for software or hardware functions on the information handling system. It is appreciated that more or fewer touch icons may be formed into the icon panel and incorporated window and the present specification contemplates this. As described herein, these touch icons that form the windows in the icon panel and incorporated window may have, in an example embodiment, the shape of a microphone representing a "mute" button and a video camera representing a video streaming on and off button, among other window shapes for other touch icons. It is appreciated that these are merely examples of touch icons that may be presented on the icon panel and incorporated window and that may be incorporated into the keyboard. Accordingly, the present specification contemplates other touch icons that allow a user to toggle input provided at the keyboard for functional states of software or hardware from a first state and a second state.

The method 1100 further includes forming an electrochromic film layer under the icon panel and incorporated window at block 1115. A separate electrochromic film layer may be formed under the icon panel and incorporated window for each touch icon available on the icon panel and incorporated window. Again, the electrochromic film layer may be any type of electrochromic film that, when a voltage pulse is applied to the electrochromic film, the electrochromic film layer toggles between an opaque state to a transparent state. In an embodiment, the electrochromic film layer may be made of a series of layers that include an ion storage layer (e.g., an electrolyte) and electrochromic layer sandwiched between conductive layers. In some embodiments, the electrochromic layer of the electrochromic film may include any electrochromic material such as a gel substance containing a transition metal oxide such as tungsten trioxide ($WO_3$). Other gel-infused electrochromic materials may include molybdenum (Mo), titanium (T) and niobium (Nb) oxides, among others. As a voltage pulse is applied to the conductive layers of the electrochromic film layer, the opacity changes from opaque or non-transparent to a transparent or semi-transparent state. However, because a constant voltage is not necessary to maintain either the opaque state or the transparent state, a single voltage pulse applied to the electrochromic film layer causes the toggling between the opaque state and the transparent state.

At block 1120, an opaque colored film layer may be formed under the electrochromic film layer. As described herein, as the voltage pulse is applied to the electrochromic film layer and the electrochromic film layer is made transparent, the user may see through the touch icon windows formed into the icon panel and incorporated window, through the now transparent electrochromic film layer, and to the opaque colored film layer. This change the opacity of the electrochromic film layer, therefore, changes the indicator state of the touch icon on the icon panel and incorporated window thereby identifying to the user that the toggling of a software or hardware function has occurred. In an embodiment, the color of the electrochromic film layer in an opaque state is different than the color of opaque colored film layer so as to identify to the user that the actuation of the touch icon has occurred via the window for that touch icon. In an example embodiment, the color of the opaque colored film layer is red and color of the electrochromic film layer in an opaque state is a different color. Other prominent colors may be used such that the user may easily distinguish between a first state of the keyboard key (e.g., mute on) and a second state of the keyboard key (e.g., mute off).

At block 1125, a first conductive layer may be placed or formed under, at least, a portion of the electrochromic film layer for each touch icon. In an embodiment, this first conductive layer may be any type of conductive material that conducts a voltage pulse to the electrochromic film layer. In an embodiment, the first conductive layer may be a conductive sponge or foam that includes, for example, a solid metal such as aluminum (Al) with gas-filled pores. As seen in FIGS. 8A and 8B, for example, the first conductive layer may be generally coplanar with each of the opaque colored film layers associated with each of the icon windows on the icon panel and incorporated window. This coplanar arrangement of the first conductive layer with the opaque colored film layer allows the first conductive layer to electrically couple the electrochromic film layer to electrical traces formed on the icon panel PCB as described herein.

At block 1130, the method 1100 includes forming an icon panel PCB under the opaque colored film layer. In an embodiment, the icon panel PCB includes electrical traces on a top surface of the icon panel PCB, through the icon panel PCB, and on a bottom surface of the icon panel PCB. In an embodiment, the first conductive layer may be sandwiched between the top surface of the icon panel PCB and the bottom surface of the electrochromic film layer separately for each touch icon. In an embodiment, the icon panel PCB may include electrical traces that operatively and electrically couples the icon panel PCB, through the first conductive layer, and to the electrochromic film layer for each touch icon. In an embodiment, the electrical traces may pass through the icon panel PCB such that the electrical traces on the top surface of the icon panel PCB are electrically coupled to electrical traces formed on a bottom surface of the icon panel PCB.

At block 1135, the method 1100 includes forming a second conductive layer under the icon panel PCB for each touch icon. The second conductive layer, therefore, may be operatively coupled to the electrical traces formed on the bottom surface of the icon panel PCB. Like the first conductive layer, the second conductive layer may be an electrically conductive sponge or foam. Thus, an electrical circuit is created from the second conductive layer, through the icon panel PCB via the electrical traces formed on and through the top and bottom surfaces of the icon panel PCB, through the first conductive layer, and to the electrochromic film layer for each touch icon.

At block 1140, the method 1100 includes forming a piezoelectric actuator layer under the second conductive layer for each touch icon. The piezoelectric actuator layer includes a piezoelectric material that, when force is applied to the piezoelectric material when a user actuates the touch icon on the icon panel and incorporated window, a voltage is created for that touch icon. The voltage created at the piezoelectric actuator layer when the touch icon of the icon panel and incorporated window is actuated is conducted through the second conductive layer, through the electrical traces formed on and through the icon panel PCB, through the first conductive layer and into the electrochromic film layer separately for each touch icon in order to change the opacity of the electrochromic film layer at that touch icon as described herein.

At block 1145, the method 1100 includes forming an icon panel chassis under the piezoelectric actuator layer wherein the icon panel chassis includes one or more coupling holes. In an embodiment, an icon panel chassis is formed under the piezoelectric actuator layer in order to support those layers and devices below the icon panel and incorporated window described herein. In an embodiment, the icon panel chassis may include a number of coupling holes that allow a screw, bolt, clip, hook, or other fastening device to pass through in order to secure the icon panel chassis to an underside of the keyboard top chassis (e.g., 760, FIG. 7).

At block 1150, the piezoelectric actuator layer is operatively coupled to a keyboard microcontroller formed on a keyboard PCB via an electrical lead to indicate a functional toggle actuation of a software or hardware function controlled by actuating a particular touch icon. The electrical lead may be operatively coupled to a general-purpose input/output (GPIO) port of the keyboard microcontroller so that the voltage created by the deformation of each piezoelectric actuator layer associated with each touch icon may be detected at the keyboard microcontroller. The detection of the voltage output from each piezoelectric actuator layer allows the keyboard microcontroller to determine a functional state of any software or hardware function controlled by each corresponding touch icon and indicated by a current state of the electrochromic film layer. Again, in an embodiment, the keyboard microcontroller may be provided with an initial state the state of the touch icon function at the icon panel and incorporated window such that input to the information handling system may be provided. Further, the state of the electrochromic film layer (e.g., opaque or transparent) will correctly correspond to the functional state of the software or hardware function controlled by each corresponding touch icon. For example, the keyboard microcontroller may be provided with an initial state of a microphone as not muted and the state of the electrochromic film layer (e.g., opaque) when a mute icon is not active. The keyboard controller may monitor, via the voltage output from the deformation of the piezoelectric actuator layer for the mute touch icon, when the functional state of the mute touch icon has been toggled to mute the microphone. The electrochromic film layer has switched from an opaque to a transparent state indicative of the "mute" icon of the plurality of icon windows shown on the icon panel and incorporated window indicating that the mute function is actuated. In this way, the touch icon and the keyboard microcontroller may selectively mute and unmute a microphone at the information handling system and indicate the same at the touch icon without consuming voltage from a battery.

The method 1100 further includes operatively coupling a keyboard PMU to the keyboard microcontroller at block 1155. As described herein, the keyboard PCB may operatively couple the keyboard microcontroller as well as other electrical circuits and hardware that includes the keyboard PMU. This allows the keyboard microcontroller to be operatively coupled to the keyboard PMU via electrical traces and other circuitry formed on the keyboard PCB.

At block 1160, the icon panel chassis is operatively coupled to the keyboard top chassis. Again, the icon panel chassis may include a number of coupling holes that allow a screw, bolt, clip, hook, or other fastening device to pass through in order to secure the icon panel chassis to an underside of the keyboard top chassis.

The method 1100 further includes enclosing the keyboard by operatively coupling the keyboard top chassis to the keyboard bottom chassis at block 1165. This encloses a portion of the icon panel and incorporated window, the electrochromic film layer, the opaque colored film layer, the first conductive layer, the icon panel PCB, the second conductive layer, the piezoelectric actuator layer, the icon panel chassis, the keyboard PMU, the keyboard PCB, and other components within the housing of the keyboard as described herein. At this point, the method 1100 may end.

The blocks of the flow diagrams of FIGS. 10 and 11 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A keyboard operatively couplable to an information handling system comprising:

a keyboard microcontroller on a keyboard printed circuit board (PCB);

a keyboard power management unit operatively coupled to the keyboard microcontroller;

a plurality of input actuators including a window formed through each of the plurality of input actuators, wherein a first input actuator is an icon panel and an incorporated window with a touch icon for actuation between a first function state of software or hardware and a second function state of software or hardware at the information handling system;

an electrochromic film layer formed under the icon panel and the incorporated window wherein a portion of the electrochromic layer is viewable through the incorporated window; and an opaque colored film layer formed under the electrochromic film layer; and a power source to provide a voltage pulse to pass through the electrochromic film layer to change a state of opacity of the electrochromic film layer, the first input actuator is a piezoelectric layer for the touch icon to provide the voltage pulse upon deflection of the piezoelectric layer during actuation of the touch icon, wherein actuation of the first input actuator to change a function state of software or hardware at the information handling system that is controlled by the first input actuator causes the electrochromic film layer to make the electrochromic film layer opaque as a first indicator of the function state of software or hardware or make the window transparent to reveal the opaque colored film layer as a second indicator of the function state of software or hardware.

2. The keyboard of claim 1, further comprising:

the input actuator is actuated by a user to impart a force on a piezoelectric actuator layer below the input actuator to deflect the piezoelectric actuator layer, wherein a voltage pulse is created by the force imparted on the piezoelectric actuator layer to change the state of opacity of the electrochromic film layer from the first indicator of the function state of software or hardware to the second indicator of the function state of software or hardware.

3. The keyboard of claim 1 further comprising:

the input actuator is an icon panel and incorporated window;

a first conductive layer formed under a portion of the electrochromic film layer;

an icon panel printed circuit board (PCB) formed under the first conductive layer, wherein the first conductive layer operatively couples the electrochromic film layer to the icon panel PCB;

a second conductive layer formed under a portion of the icon panel PCB; and a piezoelectric actuator layer formed under the icon panel PCB for the touch icon, wherein the second conductive layer operatively couples the piezoelectric actuator layer to the portion of the electrochromic film layer for the touch icon.

4. The keyboard of claim 3, further comprising:

the icon panel and incorporated window is actuated by a user imparting a force on the piezoelectric actuator layer for the touch icon; and a voltage created by the force imparted on the piezoelectric actuator layer is transmitted through the second conductive layer, through the icon panel PCB, through the first conductive layer, and into the electrochromic film layer for the touch icon to change the opacity of the electrochromic film layer at the touch icon.

5. The keyboard of claim 1 wherein:

a second input actuator is a key cap of a keyboard key with the window formed through a portion of an outer top surface of the key cap and a second electrochromic film layer formed under the key cap wherein a portion of the second electrochromic layer is viewable through the window of the key cap and a second opaque colored film layer formed under the second electrochromic film layer of the keyboard key; and metal contact leads formed on a surface of the second electrochromic film layer, wherein actuation of the key cap by a user causes the metal contacts to contact a second voltage source and complete a circuit for the second voltage source to change a state of opacity of the second electrochromic film layer.

6. The keyboard of claim 5 further comprising:

the keyboard microcontroller detecting when the key cap has been actuated to digitally toggle between a first function state of software or hardware and a second function state of software or hardware an indicated by the state of the opacity of the electrochromic film layer.

7. The keyboard of claim 5 further comprising:

a rubber cushion gasket formed under the key cap to, when actuated by a user, reduce noise created by a bottom surface of the key cap and a keyboard chassis.

8. The keyboard of claim 5 further comprising:

an underside structure of the key cap extending down from the keycap forming a keycap channel for operative coupling into a key well of the keyboard;

the second electrochromic film layer formed to fit under the key cap and around a perimeter of the underside structure, wherein a portion of the second electrochromic layer fits such that the underside structure of the key cap extends through the electrochromic film layer.

9. A keyboard comprising:

a keyboard microcontroller;

a keyboard power management unit operatively coupled to the keyboard microcontroller;

a key cap including a window formed as a window layer into a portion of an outer top surface of the key cap and an underside structure of the key cap extending down from the keycap forming a keycap channel for operative coupling into a key well of the keyboard;

an electrochromic film layer formed to fit under the key cap and around a perimeter of the underside structure, wherein a portion of the electrochromic layer is viewable through the window and fits such that the underside structure of the key cap extends through the electrochromic film layer;

an opaque colored film layer formed under the electrochromic film layer and formed to fit around the perimeter of the underside structure; and a power source from the keyboard power management unit to provide a voltage pulse upon actuation of the key cap to pass through the electrochromic film layer to change an opacity of the electrochromic film layer, where the actuation of the key cap actuates a keyboard key to change a function state of software or hardware at an information handling system operatively coupled to the keyboard as indicated by the opacity of the electrochromic film layer showing a color indicator at the window of the key cap.

10. The keyboard of claim 9 further comprising:

metal contact leads formed on a surface of the electrochromic film layer, wherein actuation of the key cap by a user causes the metal contacts to contact the power source for the voltage pulse by completing a circuit to change the opacity of the electrochromic film layer.

11. The keyboard of claim 9 further comprising:

the keyboard microcontroller detecting when keyboard key has been actuated to change the function state of software or hardware at the information handling system when actuation of the keyboard key triggers a key switch detected by the keyboard microcontroller.

12. The keyboard of claim 9 further comprising:

a rubber cushion gasket formed under the key cap to, when actuated by a user, reduce noise created by a bottom surface of the key cap and a keyboard chassis formed under the key cap.

13. The keyboard of claim 9 further comprising:

a rubber dome formed under the key cap, where the rubber dome is inserted into the key cap channel formed in the underside structure of the key cap with an upward force against an underside surface of the underside structure of the key cap to hold the key cap up until a user applies force to a top surface of the key cap.

14. The keyboard of claim 9, wherein the change in opacity of the electrochromic film layer toggles between a first opacity state of the electrochromic film layer for a first function state of software or hardware controlled by the keyboard key and a second opacity state of the electrochromic film layer for a second function state of software or hardware controlled by the keyboard key.

15. A keyboard comprising:

a keyboard microcontroller;

a keyboard power management unit operatively coupled to the keyboard microcontroller;

an icon panel and incorporated window, the incorporated window formed through the icon panel to designate a touch icon;

an electrochromic film layer formed under the icon panel and incorporated window for the touch icon wherein a portion of the electrochromic layer is viewable through the incorporated window of the touch icon;

an opaque colored film layer formed under the electrochromic film layer; and a voltage source that is a piezoelectric actuator layer to generate a voltage pulse to the electrochromic film layer for the touch icon upon actuation of the icon panel and incorporated window at the touch icon with deflection of the piezoelectric actuator layer from the actuation of the touch icon to change an opacity of the electrochromic film layer, where the actuation of the touch icon changes a function state of software or hardware at an information handling system operatively coupled to the keyboard as indicated by an opacity of the electrochromic film layer showing a color indicator at the incorporated window of the touch icon.

16. The keyboard of claim 15 wherein the electrochromic film layer in an opaque state shows a first color indicator at the incorporated window of the touch icon, and the electrochromic film layer in a transparent state shows a second color indicator of the opaque colored film layer formed under the electrochromic film layer at the incorporated window of the touch icon.

17. The keyboard of claim 15, wherein the incorporated window is formed as a window layer into an outer top surface of the icon panel to designate the touch icon.

18. The keyboard of claim 17 further comprising:

an electrical lead operatively coupling the piezoelectric actuator layer to the keyboard microcontroller to receive the voltage pulse to detect when the touch icon has been actuated to digitally toggle between a first function state of software or hardware at the information handling system and second function state of software or hardware at the information handling system.

19. The keyboard of claim 15 further comprising:

a first conductive layer formed under a portion of electrochromic film layer;

an icon panel printed circuit board (PCB) formed under the first conductive layer, wherein the first conductive layer operatively couples the electrochromic film layer to the icon panel PCB;

a second conductive layer formed under a portion of the icon panel PCB; and the piezoelectric actuator layer formed under the icon panel PCB, wherein the second conductive layer operatively couples the piezoelectric actuator layer to an underside surface of the icon panel PCB.

20. The keyboard of claim 19, wherein the icon panel is actuated by a user imparting a force on the piezoelectric actuator layer to generate the voltage pulse such that the piezoelectric actuator layer serves as the voltage source and the voltage pulse is transmitted through the second conductive layer, through the icon panel PCB, through the first conductive layer, and into the electrochromic film layer to change the opacity of the electrochromic film layer.

* * * * *